United States Patent [19]
Ikeda et al.

[11] Patent Number: 4,987,484
[45] Date of Patent: Jan. 22, 1991

[54] HALFTONE IMAGE SIGNAL PROCESSING APPARATUS IN WHICH PIXELS OF A DITHER THRESHOLD PATTERN ARE EACH DIVIDED INTO AN OPERATOR-SELECTED NUMBER OF MICROPIXELS

[75] Inventors: Yoshinori Ikeda, Hira; Tadashi Yoshida, Ichikawa; Kimiyoshi Hayashi, Tokyo; Shunichi Abe; Nobuo Matsuoka, both of Kawasaki; Mitsuo Akiyama, Higashi Murayama; Yoshinobu Mita, Kawasaki, all of Japan

[73] Assignee: Canon Kabushiki Kaisha, Tokyo, Japan

[21] Appl. No.: 355,835

[22] Filed: May 22, 1989

Related U.S. Application Data

[63] Continuation of Ser. No. 63,741, Jun. 18, 1987, abandoned, which is a continuation-in-part of Ser. No. 585,603, Mar. 2, 1984, abandoned.

[30] Foreign Application Priority Data

Mar. 6, 1983 [JP] Japan .................................. 58-36515

[51] Int. Cl.⁵ ................................................ H04N 1/46
[52] U.S. Cl. ........................................ 358/75; 358/456
[58] Field of Search .................... 358/75, 75 IJ, 78, 80, 358/76, 280, 283, 298, 296, 293 (U.S. only), 456, 457, 458

[56] References Cited

U.S. PATENT DOCUMENTS

| | | | |
|---|---|---|---|
| 3,646,242 | 2/1972 | Moe | 358/283 |
| 3,739,084 | 6/1973 | Heinrich | 358/283 |
| 3,893,166 | 7/1975 | Pugsley | 358/80 |
| 3,911,480 | 10/1975 | Brucker | 358/283 |
| 3,916,096 | 10/1975 | Everett et al. | 358/283 |
| 4,194,221 | 3/1980 | Stoffel | 358/283 |
| 4,270,141 | 5/1981 | Sakamoto | 358/78 |
| 4,271,436 | 6/1981 | Kurose et al. | 358/296 |
| 4,402,015 | 8/1983 | Yamada | 358/280 |
| 4,410,909 | 10/1983 | Ueda et al. | 358/80 |
| 4,412,225 | 10/1983 | Yoshida et al. | 358/75 IJ |
| 4,485,408 | 11/1984 | Kamizyo et al. | 358/283 |
| 4,495,522 | 1/1985 | Matsunawa et al. | 358/283 |
| 4,553,173 | 11/1985 | Kawamura | 358/283 |
| 4,595,948 | 6/1986 | Itoh et al. | 358/75 IJ |
| 4,626,901 | 12/1986 | Tanioka | 358/298 |
| 4,626,923 | 12/1986 | Yoshida | 358/283 |
| 4,783,837 | 11/1988 | Kawamura et al. | 358/283 |

FOREIGN PATENT DOCUMENTS

| | | | |
|---|---|---|---|
| 2300514 | 7/1973 | Fed. Rep. of Germany . | |
| 2948341 | 7/1980 | Fed. Rep. of Germany . | |
| 3047633 | 10/1981 | Fed. Rep. of Germany . | |
| 3101552 | 12/1981 | Fed. Rep. of Germany . | |
| 3225415 | 2/1983 | Fed. Rep. of Germany . | |
| 3226034 | 2/1983 | Fed. Rep. of Germany . | |
| 23653 | 2/1980 | Japan | 358/283 |
| 99864 | 6/1982 | Japan | 358/283 |
| 85671 | 5/1983 | Japan | 358/298 |
| 137362 | 8/1983 | Japan | 358/283 |
| 2026811 | 2/1980 | United Kingdom . | |
| 2039696 | 8/1980 | United Kingdom . | |

OTHER PUBLICATIONS

K.-A. Springstein, *Elektronische Bildverarbeitung von A–Z*, Verlag Beruf & Schule, Itzehoe, Federal Republic of Germany, 1982, pp. 65–66, 68–73, 114–117, 124–127, 235–236.

*Primary Examiner*—James J. Groody
*Assistant Examiner*—Mark R. Powell
*Attorney, Agent, or Firm*—Fitzpatrick Cella Harper & Scinto

[57] ABSTRACT

A halftone image recording apparatus includes means for recording an image on a recording medium, inputting an image signal representative of an image which includes a plurality of density levels, generating a plurality of pulsed periodic signals having different widths of one period of the image signal, selecting at least one periodic signal with a preselected pulse width among a plurality of the periodic signals, combining the selected periodic signal with the image signal, and applying the combined signal to the recording means.

25 Claims, 21 Drawing Sheets

SPECTRAL REFLECTION FACTOR
OF COLOUR MATERIALS

| MIN | Y>M(160-33) | M>C(160-34) | C>Y(160-35) |
|-----|-------------|-------------|-------------|
| Y | O | × | 1 |
| M | 1 | O | × |
| C | × | 1 | O |

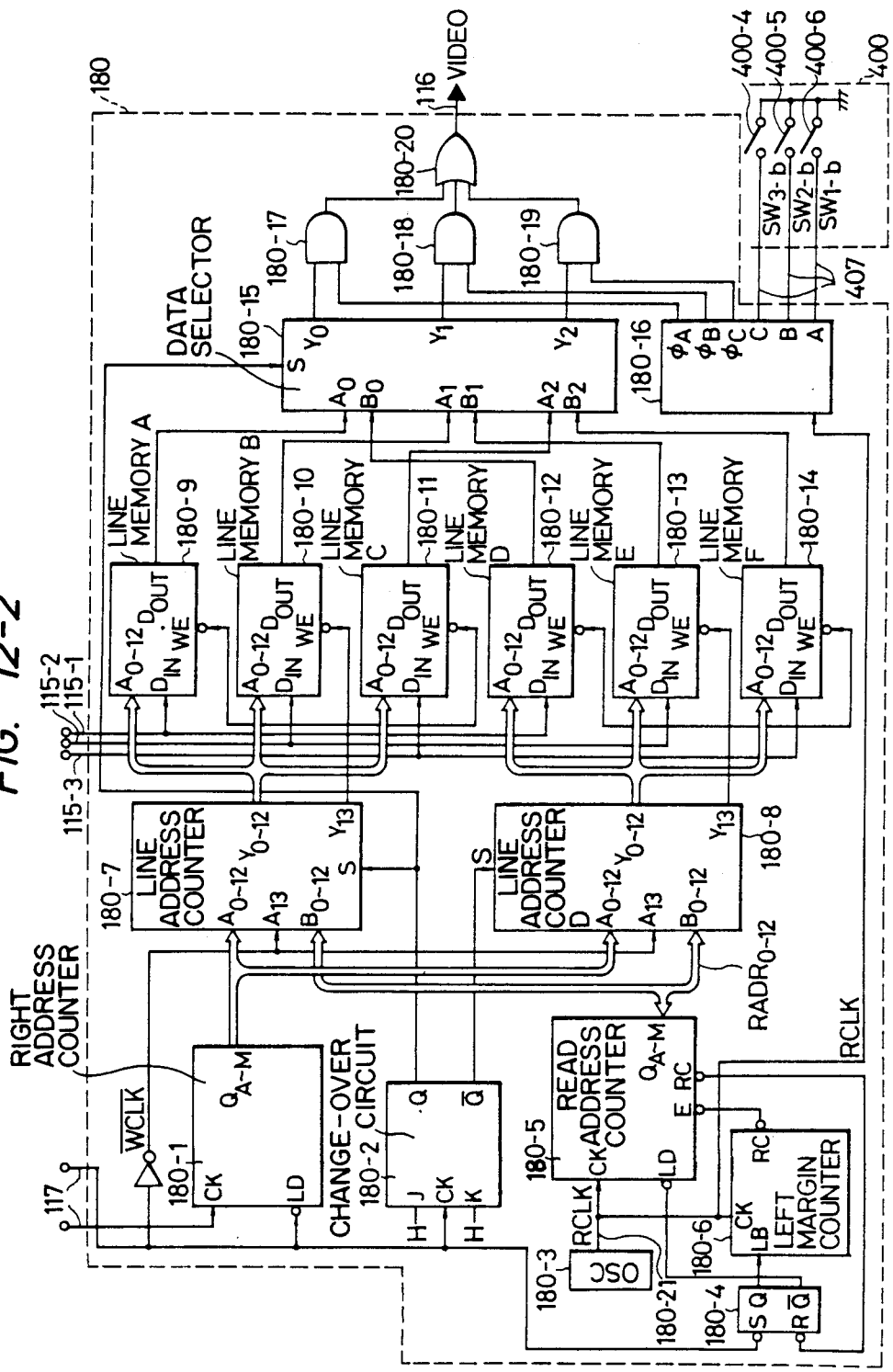

HALFTONE IMAGE SIGNAL PROCESSING APPARATUS IN WHICH PIXELS OF A DITHER THRESHOLD PATTERN ARE EACH DIVIDED INTO AN OPERATOR-SELECTED NUMBER OF MICROPIXELS

This application is a continuation of application Ser. No. 07/063,741 filed June 18, 1987, now abandoned, which is a continuation of application Ser. No. 06/585,603 filed Mar. 2, 1984, now abandoned.

BACKGROUND OF THE INVENTION

1. Field of the Invention

The present invention relates to an image processing apparatus for processing images by applying a digital processing technique thereto.

2. Description of the Prior Art

In the prior art, there is known a color copier wherein an original image is subjected to color separation into three colors using a color separation filter. The original is scanned for each color separation, a latent image is formed on a photosensitive body by a color-separated luminous image to be developed with a complimentary color developer, and a multi-color superposition is carried out to reproduce a color image.

As for these kinds of color copies, since color balance is necessary for the reproduction of color images, half-tone representation and the like have been implemented by utilizing analog characteristics of electrostatic photography, adjustment for the image exposure amount and electric charging conditions for the photosensitive body and so on are more complicated. Also, the variation in image quality is largely due to changes in the environment, as corona charging, photosensitive elements and the like would often suffer directly from the effects of temperature and humidity.

Further, since the process, from reading-out of the original image to formation of a latent image, has been put into practice through all two-dimensional optical systems, it was impossible to process the image at the separate points thereof.

SUMMARY OF THE INVENTION

In view of the aforementioned problems, the present invention has been implemented, and it is an object of the present invention to provide an improved image processing apparatus capable of reproducing a high-quality image.

Another object of the present invention is to provide an image processing apparatus capable of correcting a gradient of color image data.

A further object of the present invention is to provide an image processing apparatus wherein digital processing is carried out in real time by means of some memory means.

Yet another object of the present invention is to provide an image processing apparatus capable of implementing color image processing at high speed.

Another object of the present invention is to provide an image reproduction apparatus which is excellent in half-tone reproduction of full colors.

Another object of the present invention is to provide an improved digital processing color copier.

Another object of the present invention is to provide an image processing apparatus that makes variable the parameters of digital image processing.

Another object of this invention is to provide an image processing apparatus in which the number of gradations can be selected in accordance with reproduced images, with the number of gradations or threshold matrices being variable.

Another object of this invention is to provide an image processing apparatus capable of reducing moire and other factors through dither processing by means of a dither matrix which differs according to colors.

Another object of this invention is to provide an image processing apparatus whose constitution is simplified through multi-gradation of color data by means of uniform multi-value processing techniques.

Another object of this invention is to provide an image processing apparatus wherein images can be reproduced at higher speeds by eliminating the under color in real time.

Another object of this invention is to provide an image processing apparatus in which the quality of images can be upgraded because the correction value for eliminating under colors is different from the peak value of color data.

Another object of this invention is to provide an image processing apparatus capable of reproducing high-quality color images by correcting the characteristics of color separation with a filter.

Detailed explanation concerning the foregoing descriptions and other objects of this invention will be given hereinafter.

BRIEF DESCRIPTION OF THE DRAWINGS

FIG. 2-1 illustrates the spectroscopic characteristics of a halide lamp and the spectral sensitivity characteristics of a CCD;

FIG. 2-2 illustrates the spectral sensitivity characteristics of a CCD through a color separating prism and a multi-layer film filter;

FIG. 2-3 illustrates the spectroscopic characteristics of a color separating prism;

FIG. 2-4 illustrates the spectroscopic characteristics of each color filter;

FIG. 3-1 is a block circuit diagram showing a main unit controller;

FIG. 3-2 illustrates an operational part of said main unit controller;

FIG. 3-3 illustrates an operational part of a sub-control unit;

FIG. 3-4 illustrates a timing chart showing an operative timing of each portion of said color copier;

FIG. 3-5 illustrates a schematic configuration of a sequence clock generator;

FIG. 4 is a block diagram showing a schematic configuration for processing the color images;

FIG. 5-1 is a block circuit diagram showing the construction of a synchronous control circuit;

FIG. 5-2 illustrates a timing chart of the signals in said synchronous control circuit;

FIG. 6-1 illustrates the construction of a CCD;

FIG. 6-2 is a block diagram of a CCD driver;

FIG. 7-1 illustrates a distribution of quantity of light on the surface of a CCD:

FIG. 7-2 is a block circuit diagram showing a shading correction circuit;

FIG. 8-1 is a block circuit diagram showing Y correction circuit;

FIG. 8-2 is a view showing the relationship among an original concentration, characteristics of a CCD and an image processing unit, and the concentration of reproduced images;

FIG. 9-1 illustrates the spectral reflection characteristics for a toner;

FIG. 9-2 is a block circuit diagram showing a masking processing circuit;

FIG. 10-1 is a block circuit diagram showing a masking processing circuit and a UCR processing circuit;

FIG. 10-2 illustrates any condition of the signals outputted from a latch circuit in response to the magnitude of image data;

FIG. 10-3 illustrates a UCR processing;

FIG. 12-1 is a block circuit diagram showing a dither processing circuit;

FIG. 12-2 is a block circuit diagram showing multivaluation processing circuit.

DESCRIPTION OF THE PREFERRED EMBODIMENTS

Figure 1:
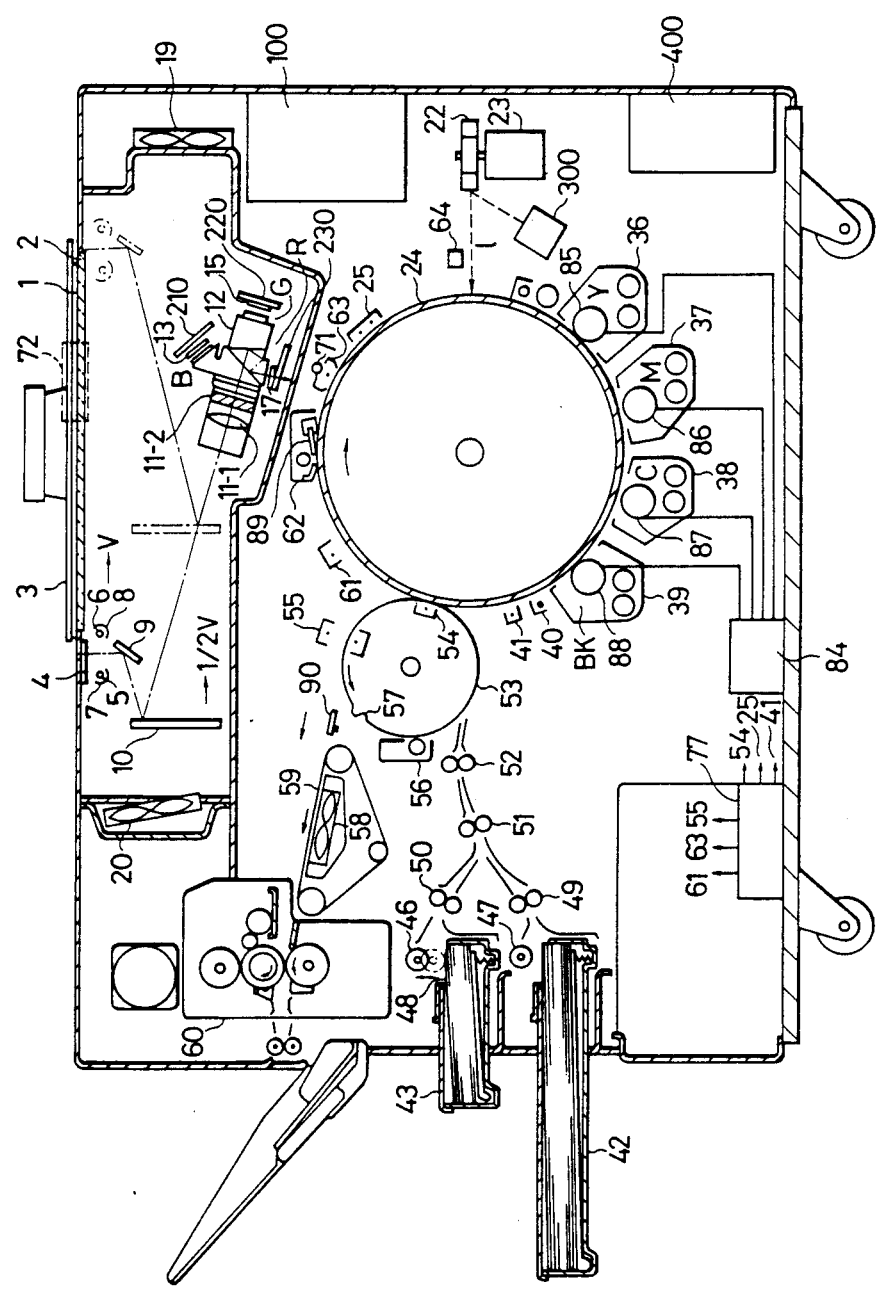
FIG. 1 is a cross-sectional view of a color copier in accordance with the present invention.

The following descriptions, given in detail, are concerned with the illustrative embodiments of this invention being put into practice, is shown in the drawings.

FIG. 1 shows a sectional view of a copier to which this invention is applied.

The original 1 is placed on the transparent plate of the script stand 2 and pressed by the script cover 3 from above. The light focused by the halogen lamps 5 and 6 (both illuminate the original) and reflector shades 7 and 8 irradiate the original and the reflected light is radiated on the movable reflex mirrors 9 and 10. This reflected light then goes over to the color separating prism 12 after passing through the lens 11-1 and infrared cut filter 11-2. At the color separating prism 12, the light is separated into three spectral components each having a different wave length i.e. blue (B), green (G), and red (R). The three separated lights (B, G and R) undergo regulation of light intensity and correction of separation characteristics by means of blue filter 13, green filter 15, and red filter 17, respectively, and then the entire light is received by the solid image pickup elements (CCD) 210, 220 and 230.

The image reflected from the original 1 is formed on the solid image pickup elements (CCD) 210, 220 and 230 in the same way as mentioned above, at half the moving speed of the movable reflex mirror 9 whose motion is integrated with the halogen lamps 5 and 6. This occurs after the image goes through the lens 11 1, infrared cut filter 11-2, and color separating prism 12, with a constant length optical path being maintained by the reflex mirror 10 which moves in the same direction. The output of each solid pickup element undergoes digital signalization at the CCD light receiving unit 200 (see FIG. 4, which will be mentioned later) of each CCD. The image processing unit 100 processes the image and releases a laser beam which is modulated by an image signal from the laser modulation unit 300 to a polygon mirror 22, and then irradiates a photosensitive drum 24. The polygon mirror 22 is revolving at a regular speed which is controlled by the scanner motor 23, and the laser beam is being vertically scanned in the same revolving direction as the photosensitive drum 24.

The photosensor 64, which is set up before the point where the laser starts scanning the photosensitive drum 24, produces the horizontal synchronizing signal BD of the laser caused by the passage of laser beams. After being evenly charge-erased by the charge erasure electrode 63 and charge erasure lamp 71, the photosensitive drum 24 becomes uniformly negatively charged by the minus charger 25 which is connected to the high voltage generator 77. When the laser beam (which is modulated by the image signal) contacts the photosensitive drum 24 (which is uniformly negatively charged), the electric charge of the photosensitive drum 24 flows to ground and is eliminated through the optical conduction of electricity. The laser shall be turned on in the high density area and turned off in the low-density area of the original. Under these conditions, the electric potential on the surface of the photosensitive body ranges from $-100$ V to $-50$ V in the high-density area and around $-600$ V in the low density area of the original placed on the photosensitive drum 24. An electrostatic latent image is formed in this way depending on the light and shade of the original.

This electrostatic latent image is then developed by the yellow developer (Y) 36, magenta developer (M) 37, cyan developer (C) 38, or black developer (BK) 39, which is selected by the signal from the main unit controller 400. A toner picture is then formed on the surface of the photosensitive drum 24. In that instance, a voltage is applied from the developing bias generator 84 so that the electric potential of the developing sleeves 85, 86, 87 and 88, which are within the developer of each color, should be kept between $-300$ V and $-400$ V.

The toner within the developers is stirred and negatively charged so that it adheres to the spot where the surface potential of the photosensitive drum 24 exceeds the developing bias potential. A toner picture is thus formed in conformity with the original. Then, by means of the high voltage generator 77 and lamp 40, which is designed to erase the drum surface potential, the unnecessary electric charge remaining on the photosensitive drum 24 is eliminated by the negatively charged post electrode 41, thereby equalizing the surface potential of the photosensitive drum 24.

The transfer paper, on the other hand, which is stored in either of the cassettes 42 or 43 (cassette selection is made via the operation board 72), is supplied through paper feeding action performed by either the paper feed roller 46 or 47. Oblique movement of the paper is corrected by the first resist roller 49 or 50, and the paper is conveyed within a prescribed duration of time by the convey roller 51 and second resist roller 52. The margin of the transfer paper is firmly retained by the gripper 57 of the transfer drum 53, around which the transfer paper is electrostatically wrapped.

The toner picture formed on the photosensitive drum 24 is transcribed onto the transfer paper by the transfer electrode 54 at the point where it comes in contact with the transfer drum 53. Transfer of the toner picture onto the transfer paper is repeated as many times as defined by the copying color mode being selected. Upon completion of the transfer of all toner pictures, paper charge erasure is performed by the charge erasure electrode 55 for which high voltage is supplied from the high voltage generator 77. After the transfer is performed as many times as prescribed, the transfer paper is peeled from the transfer drum 53 by means of a split nail 90 and directed to the fixing device 60 after being drawn onto the convey belt 59 by means of the convey fan 58.

The residual electric charge remaining on the photosensitive drum 24 is further erased by the pre-cleaner charge eraser 61, and the residual toner remaining on the photosensitive drum 24 is eliminated by the cleaning blade 89 located in the cleaner unit 62. Further, the electric charge on the photosensitive drum 24 is eliminated by the pre-AC charge eraser 63 and charge erasure lamp 71. The process then continues to the next cycle.

Heat generated by the lighting system is discharged by the cooling fans 19 and 20 of the optical system.

Now, the case of full-color mode will be explained, with the operation sequence being categorized into four colors (Y, M, C and BK). Prior to the scanning of original 1, the white calibration plate 4 is scanned every time. This is intended to read the white calibration plate 4 in the image processing unit 100 of one scanning line for shading correction purposes, which will be mentioned later. Then, as original scanning continues, the three-color (B, G and R) image is read out simultaneously at CCD 210, 220 and 230. The quantity of Y, M, C (which are the complementary colors of B, G, R, respectively) and BK of black plate is calculated at the image processing unit 100 and the process of color modification and other steps are implemented.

Original scanning is performed four times. The signal of yellow (Y) component, calculated at the image processing unit 100, undergoes laser modulation at the first scanning, thereby forming a latent image on the photosensitive drum 24. This latent image is developed by the yellow developer 36 and transferred to the paper which is wrapped around the transfer drum 53. Other images are transferred to the paper likewise, i.e., magenta (M) by the magenta developer 37 at the second scanning, cyan (C) by the cyan developer 38 at the third scanning, and black (BK) by the black developer 39 at the fourth scanning. These images are fixed by the fixing device 60, and then image recording in the full-color mode is completed.

Figures 1, 2:
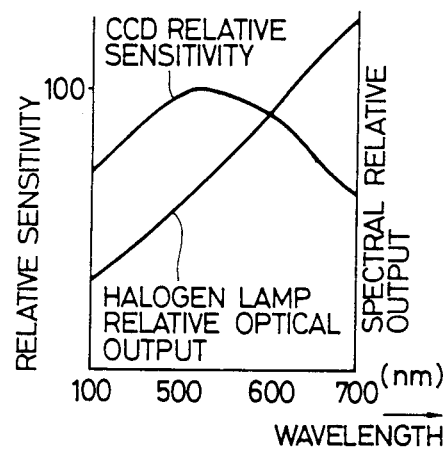
Figure 2:
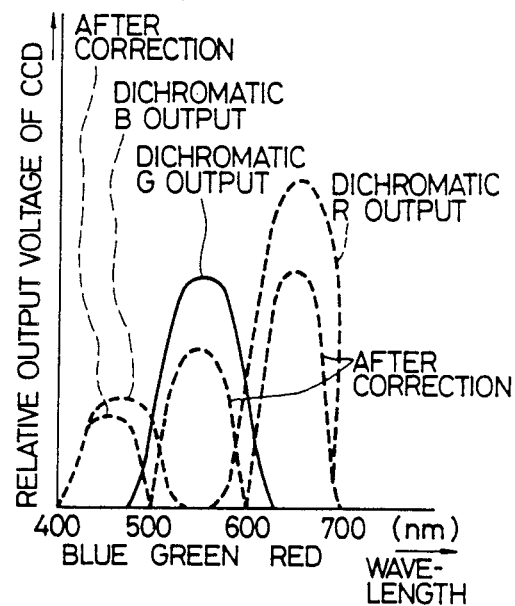

As illustrated in FIG. 2-1, the spectral energy distribution of a halogen lamp for original exposure features high optical output in the long wave lengths (red area) and low optical output in the short wave lengths (blue area). Wavelengths ranging between 500 and 600 nm (green area) features high spectral sensitivity in CCD, as shown in FIG. 2-1. The light reflected from the original, therefore, varies in accordance with the spectral characteristics of the halogen lamp after encountering the output from the color separating prism 12, as illustrated in FIG. 2-2.

Figures 2, 3:
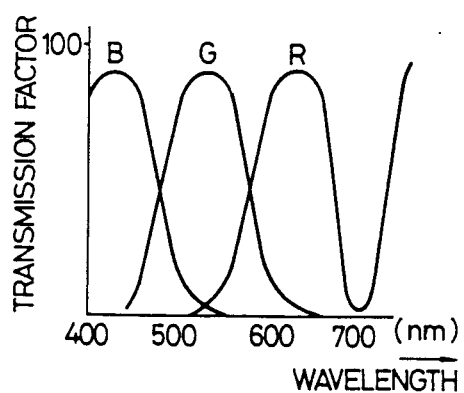
Figures 2, 3, 4:
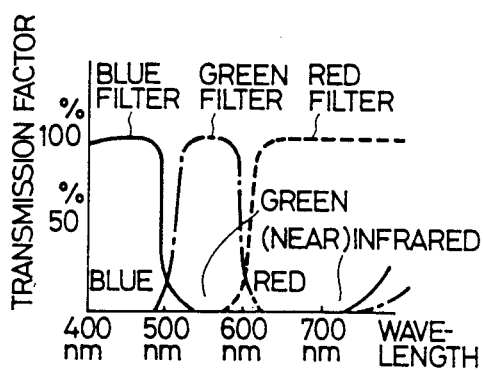

The spectral characteristics of the color separating prism 12 are inferior, as is obvious from FIG. 2-3. Therefore, through the multi-film interference filter, which features a spectral transmission factor as shown in FIG. 2-4, an optical image from color separation without unnecessary wavelength components may be produced as shown by the DICHROMATIC OUTPUT dashed lines in FIG. 2-2. Also, the spectral transmission factor may be changed by overlapping a plurality of filters for each color, thereby correcting the unbalanced output as shown by the AFTER CORRECTION dashed lines in FIG. 2-2.

A block diagram of the main unit controller 400 (FIG. 4) is given in FIG. 3-1. The main control unit 422 and the sub control unit 421, which constitute the operating unit, are handled by a mechanical operator. The main control unit 422, as illustrated in FIG. 3-2, corresponds to the operating board 72 shown in FIG. 1. Number 72-9 indicates a copy button to start the copying action, 72-19 a numerical value input key system to set the number of copies, 72-16 and 72-17 a cassette selection key to select the lower or upper cassette (42 and 43, respectively, in FIG. 1), and 72-2 to 72-8 a color mode selection key to select the color copy mode.

For example, the 4 Full mode selected by the 72-2 key is the mode where original exposure scanning is repeated 4 times and the development by toners, Y, M and C, is performed in accordance with the exposed image whose color is separated into B, G and R for each scan. At the fourth scan, development by toner BK is performed corresponding to the BK component of the original, and a copy of the full color image is produced by superposing all 4-color images. Likewise, copies are produced by toners Y, M and C for each of the three exposure scans in the 3 Full mode; by BK and M for two exposure scans in the BK+M mode; and by single color toner image for one exposure scan in the BK, Y, M, C mode.

Reference numeral 72 23 indicates a 7 segment LED to show the number of copies being set, 72-18 a 7 segment LED to show the number of copies being counted, 72-15 the indicator which lights when there is no feeding toner in the hopper (not illustrated) as determined by a detector (not illustrated), 72-14 an indicator which is energized when a jam is detected by a jam detector equipped in the paper conveying channel of this apparatus, 72-20 the indicator which is energized when no paper in the selected cassette is detected by a detector (not illustrated), and 72-1 a wait indicator which lights when the surface temperature of the fixing roller in the thermal pressure fixing device 60 does not reach a prescribed degree. Copying action will not start if any or all of the indicators 72-15, 72-14, 72-20 and 72-1 are turned on.

Indicator 72-21 lights when copy papers (selected by the paper size indicator) within a cassette are of A3 size. Indicator 72-22 lights when copy papers are of A4 size. Selector 72-12 works by means of the copy density control lever so that the lighting voltage of halogen lamps 5 and 6 decreases when the lever is shifted toward setting 1 and increases when it is shifted toward setting 8.

The sub control unit 421 now will be explained with reference to FIG. 3-3. Reference numerals 421-14 to 421-16 are the switches connected to the Y correction circuit 140 (mentioned later in connection with FIG. 4) which corrects the gradient features of read out data against the 8-bit picture element data read out at CCD and quantized by an A/D converter. These are made up of rotary digital code switches which give rise to each digital code. As explained later, these switches are connected so that data conversion memory elements with required Y characteristics can be selected from a plurality of memory elements accommodated in the data conversion table within the Y correction circuit.

Reference numerals 421-5 to 421-13 indicate the switches to be used for masking processing. At the masking processing circuit 150 (mentioned later in connection with FIG. 4), the coefficients ai, bi, and ci ($i=1$, 2 and 3) applying to the following conversion equations shall be established against the input image data Yi (yellow), Mi (magenta) and Ci (cyan). As in the case of switches 421-14 to 421-16 above, these are made up of rotary digital code switches which generate the digital codes ranging from 0 to 16.

Data conversion equations for masking processing are as given below:

$Y_o = a_1 Y_i - b_1 M_i - c_1 C_i$ $M_o = -a_2 Y_i + b_2 M_i - c_2 C_i$ $C_o = -a_3 Y_i - b_3 M_i + c_3 C_i$

Reference numerals 421-1 to 421-4 represent the rotary digital code switches that provide coefficients of correction for the data Y, M, C and BK at the UCR processing circuit 160 (mentioned later in connection with FIG. 4). Reference numerals 421-20 to 421-23 constitute the volume controls connected individually to the high voltage generator 77. These volume controls control the current flowing into the charger 25 by which the photosensitive drum is equally charged with negative electricity. The pictorial light and shade of each color is adjustable and color balance is changeable by means of this volume. Reference numeral 421 24 is the switch for selecting gradient characteristics at the time of multivalue dither processing, as explained later.

Again referring to FIG. 3-1, reference numeral 411-65 represents the sequence controller that controls all loads in the entire apparatus. The load shown in the timing chart of FIG. 3-4, including the drive motor of photosensitive drum 24, charge eraser, exposure lamp, etc., is driven from the sequence controller through I/O port 419 to load drive circuit 420 at a prescribed length of time conforming to the sequence control table in ROM 423. The marks $L_1, L_2 \ldots L_N$ in FIG. 3-1 stand for the value of each load, but the driving method of each load, including solenoid, motor, and lamp, as well as the sequence control method based on ROM, are all well known, and therefore the explanation concerning these is omitted here. The main control unit 422 and the sub-control unit 421 correspond to the operating section respectively. But the driving load involves the key, lamp, LED, etc., and the drive of, or input in, these devices is implemented by the key and display controller 412.

The driving of the LED and lamp, scanning of keys, and method of input, for example, are performed in a well-known way, and therefore detailed explanation is omitted. The progress of the sequence is subject to the timing chart given in FIG. 3-4. This is an example of a timing chart that brings a full color image sequence by superposing three different colors (Y, M and C). In this apparatus it is necessary to turn 5 times the photosensitive drum 24 and 10 times the transfer drum 53 in order to achieve a full color image in the above three colors. The diameter of the photosensitive drum 24 and transfer drum 53 therefore features a ratio of 2 to 1.

Figures 1, 3:
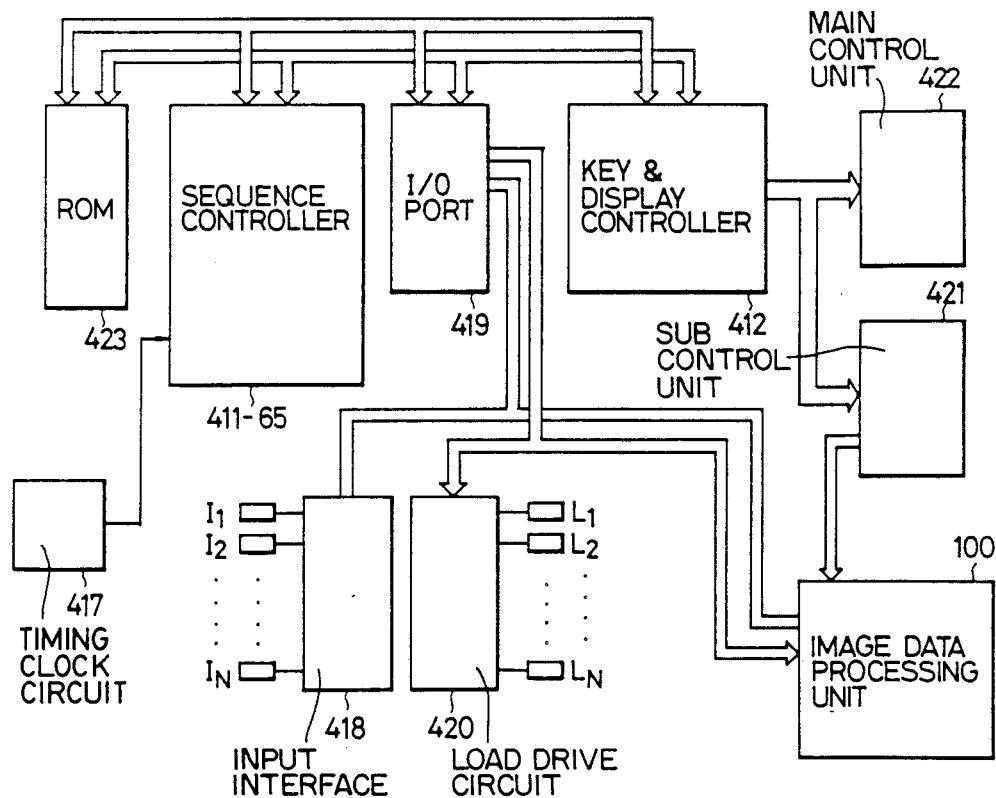
Figures 2, 3:
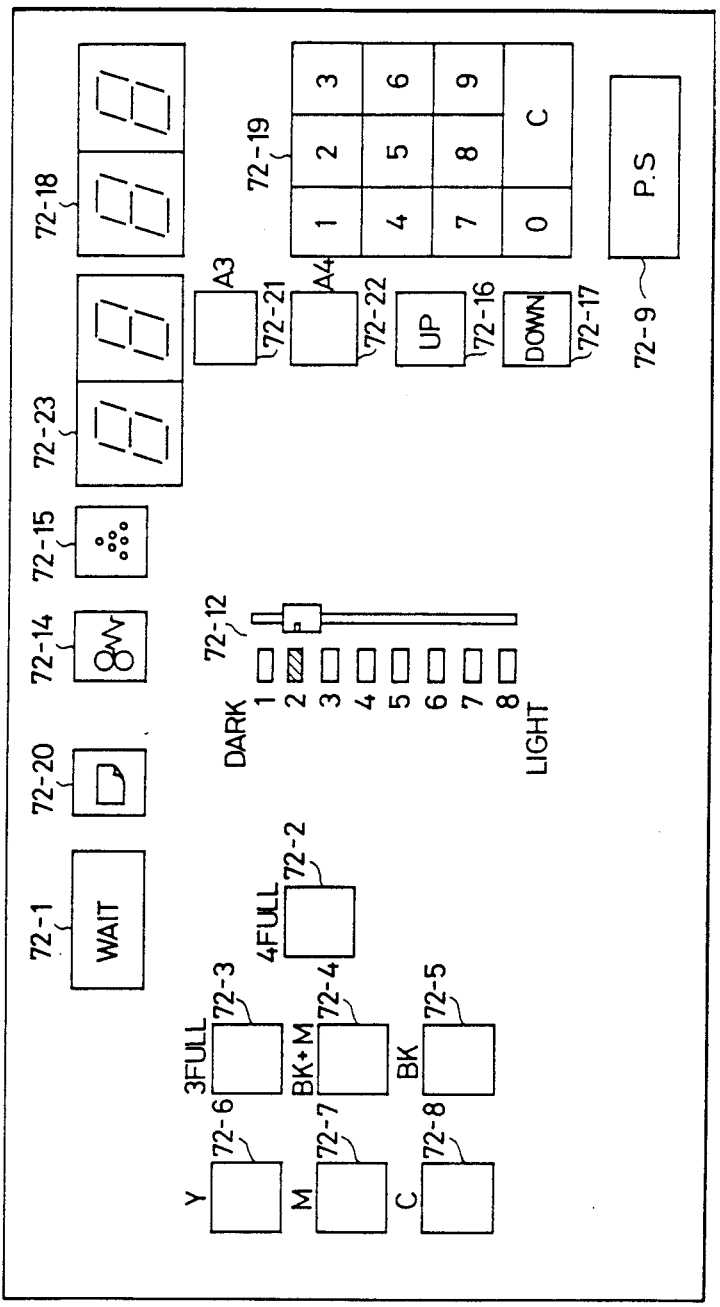
Figure 3:
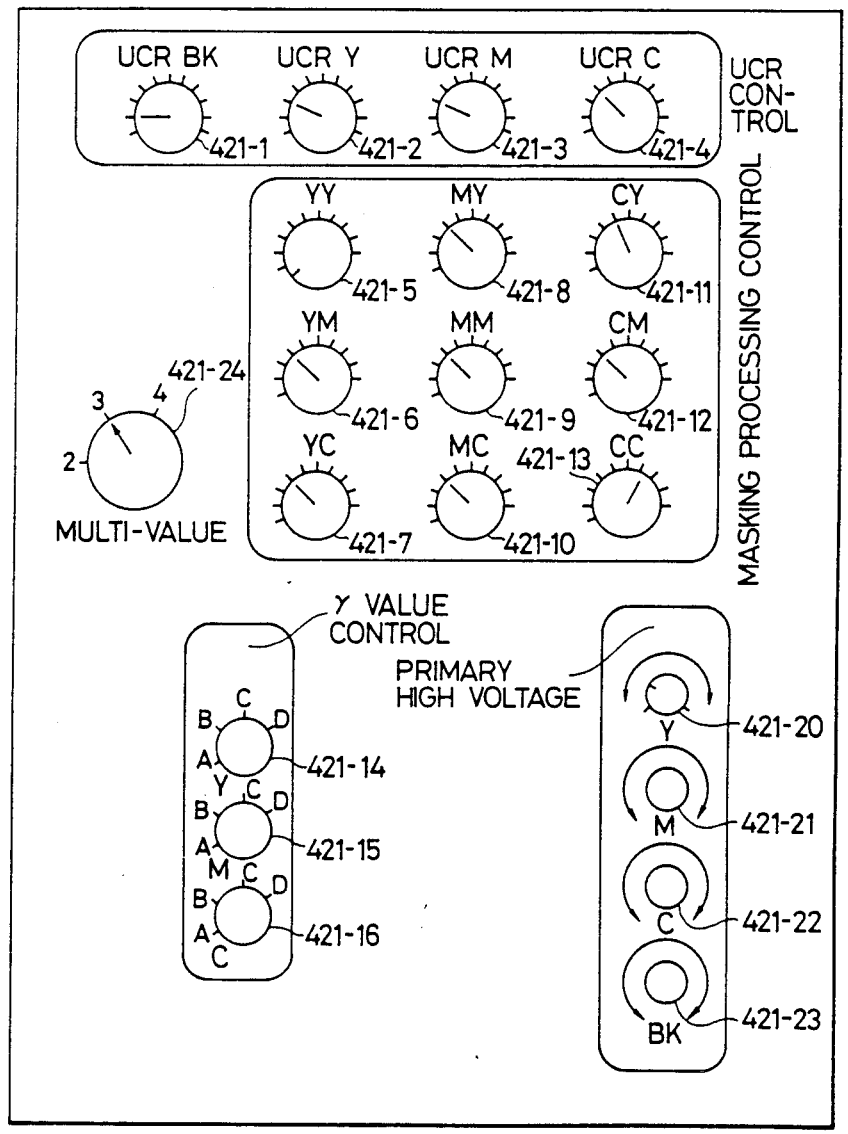
Figures 3, 4:
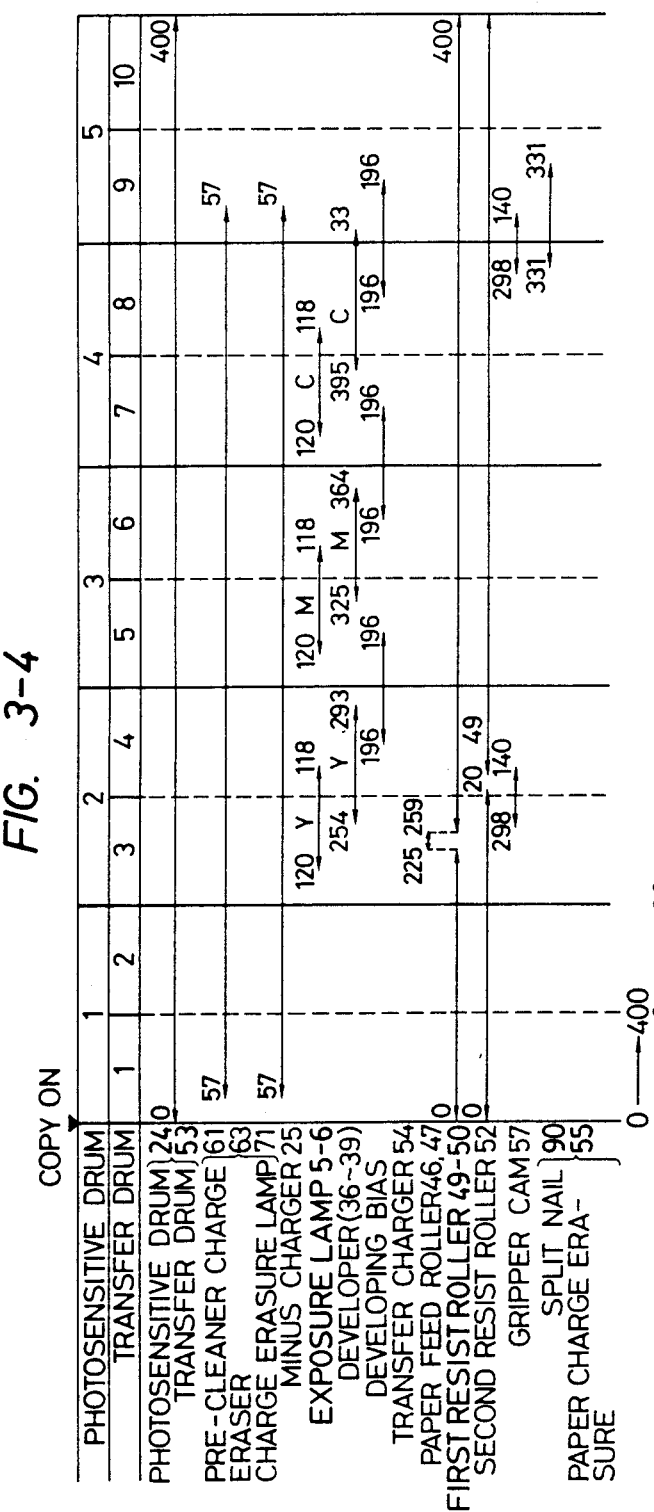
Figures 3, 4, 5:
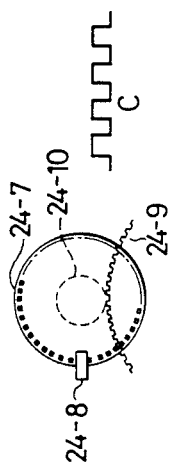
Figure 4:
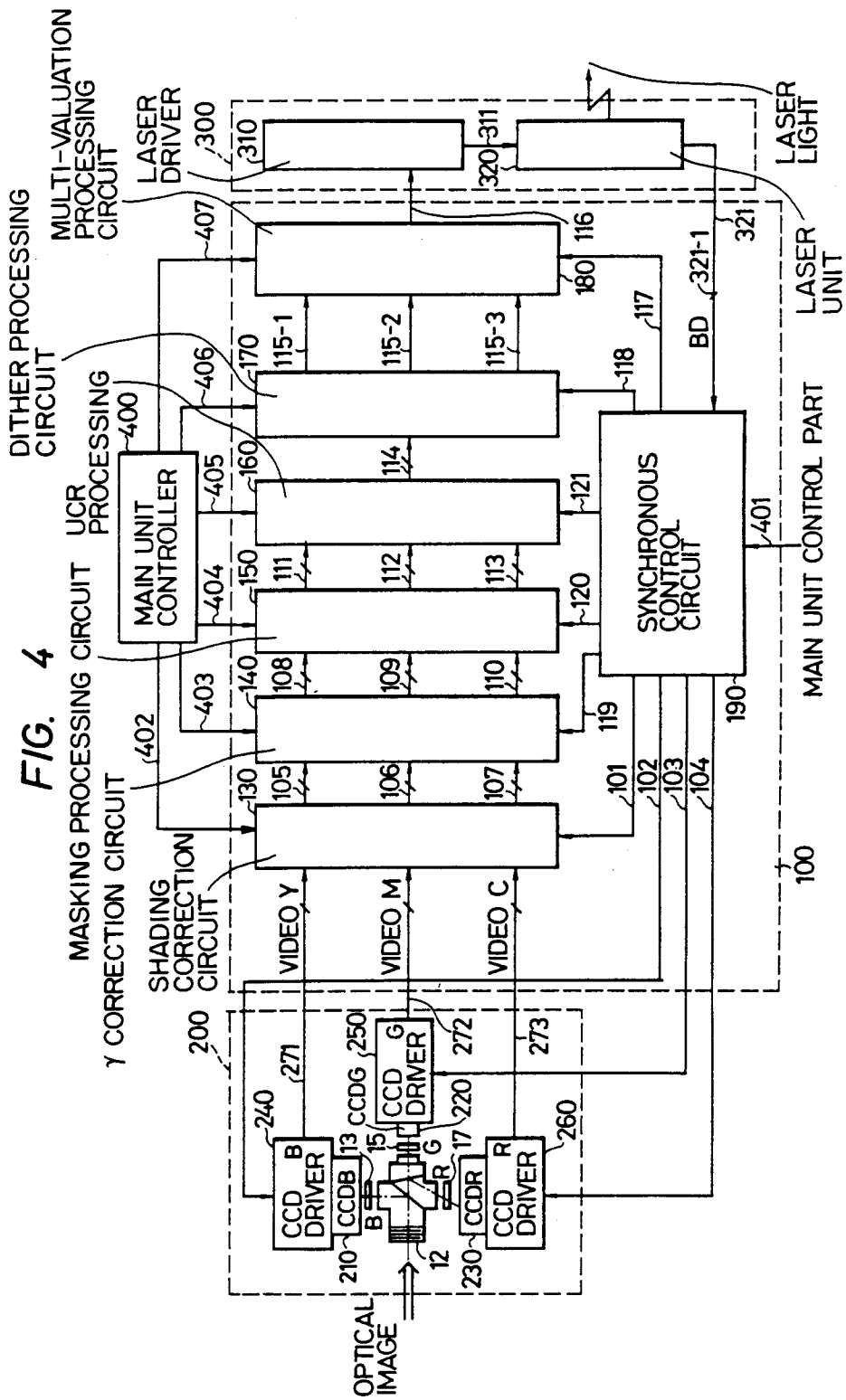
Figures 1, 5:
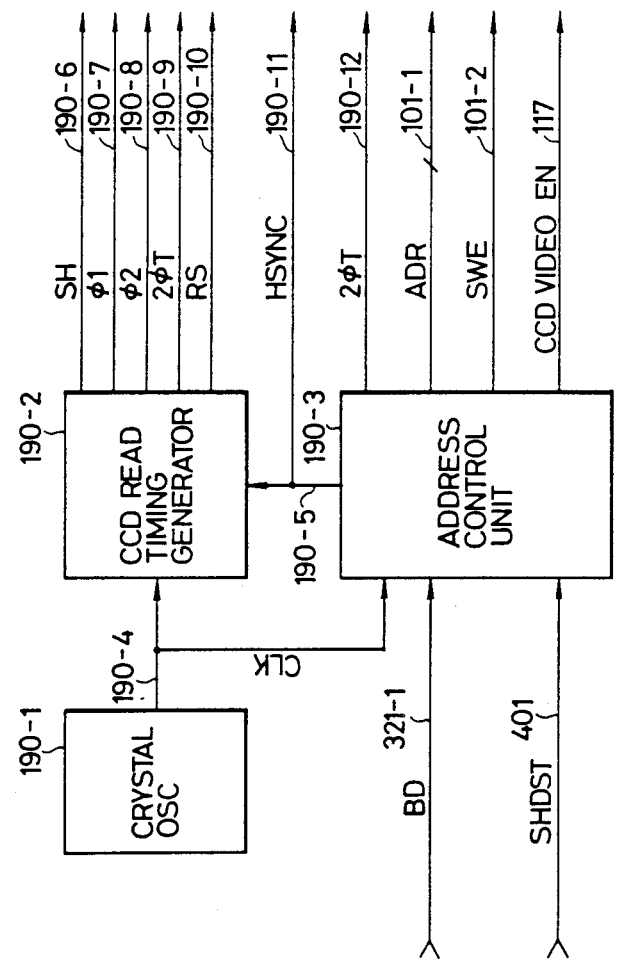
Figures 2, 5:
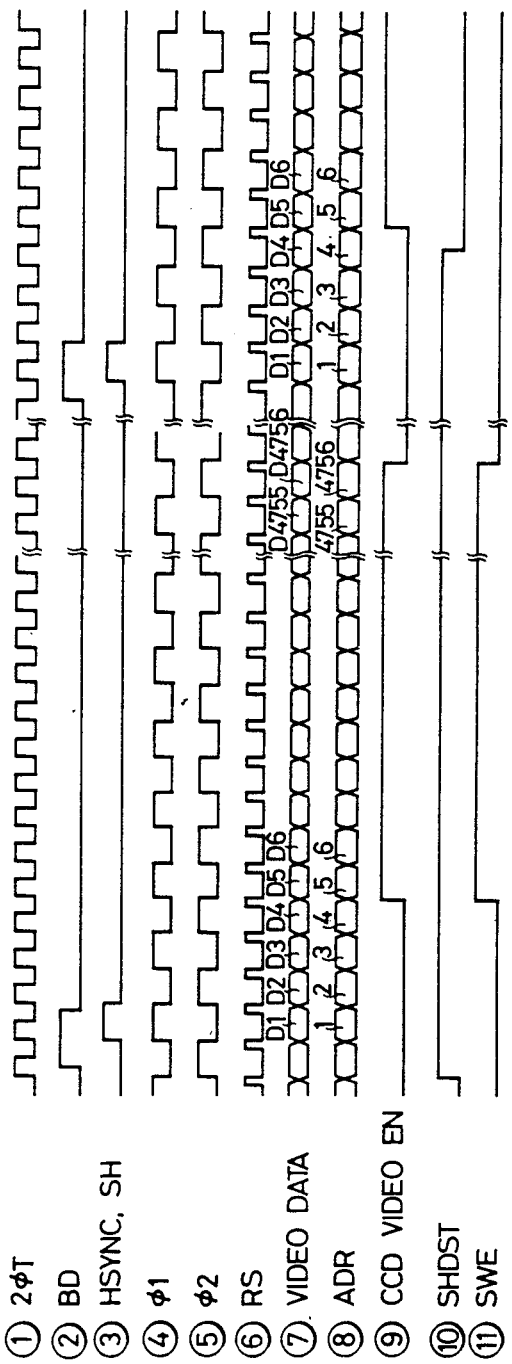

The implementation of this sequence is subject to the revolution of the photosensitive drum 24 and transfer drum 53. As illustrated in FIG. 3-5, the sequence is produced, as the photosensitive drum 24 revolves, by means of the clock board 24 7 which is driven by the gear 24-9 (driven by the driving shaft 24 10 of the photosensitive drum 24) as well as by means of the sequence clock generator which is composed of the photointerrupter 24-8. The sequence progresses in response to the drum clock C, with the clock counting 400 per revolution of the transfer drum. The on off control of the load is therefore performed on the basis of counting at the home position (hereinafter referred to as "HP") of the transfer drum 53.

In the timing chart of FIG. 3-4, the numerals indicating the operational and non-operational timing represent each clock-counting value, with the clock number at the transfer drum HP being set at 0. For example, the exposure lamps 5, 6 go on at clock count 120 in the third revolution of the transfer drum, at 120 in the fifth revolution, and at 120 in the seventh revolution, respectively. It goes off at clock count 118 in the fourth revolution, at 118 in the sixth revolution, and at 118 in the eighth revolution, respectively.

Given the timing chart of FIG. 3-4, the operational steps of the present image processing apparatus are outlined as follows according to its structural drawing shown in FIG. 1. When the switch on of copy button 72-9 is sensed by the key and display controller 412, the sequence controller 411-65 starts the copy sequence and begins to drive the photosensitive drum 24, transfer drum 53, first resist rollers, i.e., either 49 or 50, convey roller 51 and second resist roller 52. After one revolution of the photosensitive drum 24, the charge on the drum surface is erased by the pre charge erasers 61 and 63, charge erasure lamp 71, and other devices, thereby being electrostatically equalized.

The original 1 is placed on the platen glass stand 2, and exposure scanning starts when the halogen lamps 5 and 6 (for original exposure) go on at the 120th clock pulse in the third revolution of the transfer drum 53. The image reflected from the original is reflected on the mirrors 9 and 10, and the light is condensed by the lens 11-1 to form an image on the surface of CCD 210, 220 and 230. It then goes into the color separating prism 12, and the optical image reflected from the original also goes into CCD 210, 220 and 230 after being separated into the colors B, G and R. The optical image separated by colors, which is the counterpart of the original whose light is received at each CCD, first undergoes photoelectric conversion and then data processing in real time, which is performed by the image processing unit 100 (mentioned later). Then, as explained before, the photosensitive drum 24 is exposed successively in the order of Y, M and C by the laser light 1 which is modulated by the image data above, and a latent image corresponding to the original is now formed on the surface of the photosensitive drum 24.

In the timing chart of FIG. 3-4, the latent image, formed on the photosensitive drum 24 in response to the first exposure scan, begins to operate at the 254th clock in the third revolution of the transfer drum 53, and is developed by the Y (yellow) developer 36 which ceases to operate at the 293rd clock in the fourth revolution. It then starts action at the 196th clock in the same revolution, and by means of the transfer charger 54, which stops action at the 196th clock in the next revolution, a yellow toner image corresponding to the yellow component of the original is transferred to the paper which is wrapped around the transfer drum 53.

Likewise, a magenta toner image corresponding to the magenta component of the original is transferred to the paper in the fifth, sixth, and seventh revolutions of the transfer drum 53. A cyan toner image corresponding to the cyan component of the original is transferred to the paper in the seventh, eighth, and ninth revolutions. All these toner images are multi transferred at a prescribed timing so that the margin of developed images Y, M and C should coincide.

The optical image reflected from the original goes into CCD 210, 220 and 230 at the color separating prism 12 after being separated into three color components B, G and R. For color correction, however, the signals G and R are used at the time of image reading to form a yellow toner image, the signals B and R are used at the time of image reading to form a magenta toner image, and the signals B and G are used at the time of image reading to form a cyan toner image. These processings are conducted successively in the order of Y, M and C.

At the 225th clock pulse in the third revolution of the transfer drum where the first exposure scan is performed, the paper feed rollers 46 and 47 begin to work in the upper and lower cassettes, respectively, to feed transfer papers from either of the cassettes 42 or 43 selected at the operation unit. The transfer papers fed from either cassette 42 or 43 are conveyed by the either of the first resist rollers 49 or 50, and their oblique movement is corrected by the convey roller 51. At the second resist roller 52, a prescribed timing is established so that the transfer papers are held firmly by the gripper 57 of the transfer drum 53. After their margin is fixed by the gripper 57, the transfer papers are wrapped around the transfer drum 53 to accomplish the multiple transfer of toner images, as mentioned before.

Upon completion of the multiple transfer, the transfer papers are drawn off from the transfer drum 53 by the split nail 90 and directed by the convey belt 59 to the fixing device 60, where they are fixed by thermal pressure and discharged. The operational timing pertaining to each of the load discussed above is as shown in the timing chart of FIG. 3-4.

FIG. 4 shows a block diagram outlining the composition of this invention focusing on the image processing unit 100. The image processing unit 100 constitutes the part for computing a proper quantity of the signals Y(yellow), M(magenta), C(cyan), and BK(black), all of which are necessary for printing based on the 3-color image signals read out at the CCD light-receiving unit 200. These colors have their respective output for the laser modulation unit 300.

In order to produce a color picture by means of this apparatus, it is necessary to scan the original 4 times with the CCD light-receiving unit 200 in the case of 4-color (Y, M, C and BK) printing and 3 times in the case of 3-color (Y, M and C) printing. That is, multicolor printing requires superposed original scanning.

The image processing unit 100 is composed of the following circuit blocks. Block 130 makes up a shading correction circuit that corrects the optically unequal illumination of the image signals read from the CCD light receiving unit 200, where correction is performed individually at every scan for the color separated signals Y, M and C. Block 140 is a Y correction circuit that corrects the gradient characteristics of each color signal in conformity with the masking and UCR corrections. Block 150 is a masking processing circuit that calculates an appropriate quantity of Y, M and C needed for printing. Block 160 is a UCR processing circuit that calculates an appropriate quantity of BK based on Y, M and C for the purpose of preparing an ink plate. Block 170 is a dither processing circuit that makes a 2-value halftone picture based on the dither method. Block 180 is a multi-value processing circuit that enhances the gradient characteristics of a half-tone picture by further modulating the pulse width of the 2-value image signal available from the dither processing circuit 170. The image processing unit 100 is made up of these processing circuits and synchronous control circuit 190 which synchronizingly controls these circuits.

The CCD light-receiving unit 200 is the section that separates an optical image into three colors (B, G and R) by means of the color separating prism 12 and transforms them into electric signals. The three different lights B, G and R undergo photoelectric conversion by CCDB-210, CCDG-220 and CCDR-230, respectively. The photoelectrically converted signals B, G and R undergo 8-bit digitalization by CCD drivers B-240, G-250 and R-260, respectively. They are further converted into signals Y, M and C which are the complementary colors of B, G and R.

The 8-bit digitalized signals Y, M and C shall be called VIDEO-Y, VIDEO-M and VIDEO-C respectively. By way of the signal lines 271, 272 and 273 respectively, VIDEOs Y, M and C are connected with the shading correction circuit 130, which performs shading correction as already explained. The shading corrected signals Y, M and C, i.e., VIDEOs Y, M and C, are fed into the Y correction circuit 140 via the signal lines 105, 106 and 107 respectively. In the Y correction circuit 140, the gradient characteristics are changed into those suited for color modification.

VIDEOs Y, M and C are converted into 6-bit signals in order to simplify the following processing steps. The 6-bit VIDEOs Y, M and C which have undergone Y correction are sent to the masking processing circuit 150 by way of the signal lines 108, 109 and 110, respectively. In the masking processing circuit 150, VIDEOs Y, M and C undergo color modification to be suited for printing, and the color-modified VIDEOs Y, M and C are then sent to the UCR processing circuit 160 by way of the signal lines 111, 112, and 113, respectively. Based on the color modified signals Y, M and C, the quantity of BK (black) is determined in the UCR processing circuit 160, after calculating the quantity of under colors to be eliminated. The BK reduced quantity of Y, M and C constitutes the color-modified quantity of Y, M and C.

These 4-color image signals Y, M, C and BK are then sent to the dither processing circuit 170 through the signal line 114 in the order of Y, M, C and BK at each scan. The signal line 114 supplies the 6-bit digital signals. Based on these signals, the dither processing circuit 170 digitally implements half tone representation in view of the dot density per unit area. Dither processing is performed under three different threshold levels (explained later), and then 2-value signals are put out into the signal lines 115-1, 115-2 and 115-3. In the multi-value processing circuit 180, a 4-value pulse width modulation is implemented on the basis of the three 2-value signals 115-1, 115-2 and 115-3. The 2-value signals having undergone pulse width modulation are sent to the laser modulation unit 300 by way of the signal line 116. Then, laser beams are released by the laser unit 320, which is driven by laser driver 310 through line 311, thereby forming a latent image on the photosensitive drum 24.

The sequence control of this apparatus as well as the control of each processing unit are performed by the main unit controller 400.

Against the image data processing unit 100, the sequence controller 411-65 (FIG. 3-1) within the main unit controller 400 sends out yellow exposure signals before manuscript exposure scanning to form the first yellow toner image, magenta exposure signals before scanning to form the second magenta toner image, cyan signals to form the third image, and black signals to form the fourth image. These signals are carried through the signal lines 403, 404 and 406 shown in FIG. 4. The exposure lamps 5, 6 irradiate the white calibration plate 4 when exposure scanning for each color starts. At that time, the exposure start signal (shading start signal) 402 is sent out to the shading correction circuit 130. After receiving this signal, the shading correction circuit 130 reads the image data for correction corresponding to the white calibration plate to implement the shading correction, as explained in detail later.

FIG. 5-1 illustrates the construction of the synchronous control circuit 190 which has been shown in FIG. 4. The synchronous control circuit consists of the crystal oscillator 190-1, CCD read timing generator 190-2, and address control unit 190-3. Synchronizing with the beam detect signal BD 321-1 per one-line scanning from the laser scanner, the synchronous control circuit drives the CCD and counts the serial picture element data released from the CCD and performs address control per each scanning line.

The clock CLK 190 4, whose frequency is 4 times as high as the image transmission clocks 2φ T 190-9 and 190-12, is fed from the crystal oscillator 190-1 to the CCD read timing generator 190-2 and address control unit 190-3. The serial image data released from the CCD is transmitted by the image transmission clock 2φ T 190-9 to the CCD drivers B-240, G-250 and R-260 via signal lines 102, 103 and 104, respectively. The image transmission clock 2φ T 190-12 sends data to each processing circuit of the image processing unit 100 via signal lines 101, 119, 120, 121, 118 and 117 (FIG. 4).

Synchronizing with the beam detect signal BD 321-1, the address control unit 190-3 produces the horizontal synchronizing signals HSYNC 190-5 and 190-11. By means of these synchronizing signals, the CCD read timing generator 190-2 sends out the shift pulse SH 190-6 (a signal that starts the reading of CCDs B-210, G-220 and R-230) to the CCD drivers B-240, G-250 and R-260 via signal lines 102, 103 and 104, respectively, thereby starting the one-line output.

The φ-1 190-7, φ2 190-8 and RS 190-10 are the signals needed for CCD driving. The CCD read timing generator 190-2 feeds these signals to the CCD drivers B-240, G-250 and R-260 via signal lines 102, 103 and 104, respectively. These signals will be discussed later.

The address line ADR 101-1 is a 13-bit signal line that counts the image signal of 4752 bits released from the CCD per each scanning line. This image signal is sent to the shading correction circuit 130 by way of the signal line 101. The shading start signal SHDST 401 is a signal that runs from the main unit controller 400 into the address control unit 190-3 and rises when the exposure lamps 5, 6 are scanning the white calibration plate 4 (FIG. 1). This signal becomes active when the halogen lamps (for original lighting) 5 and 6 are turned on and the optical system is positioned at the white calibration plate 4.

In that instance, the address control unit 190-3 sends out the signal SWE 101-2 to the shading correction circuit 130 via signal line 101, but that applies to only the block where the one-line image data for the white calibration plate are released from the CCD. Signal CCD VIDEO EN 117 indicates the block where 4752 bits of data are released from the CCD per each scanning line. This signal is sent to the multi-valuation processing circuit 180 by way of the signal line 117.

FIG. 5-2 shows a timing chart that indicates the timing pertaining to each part of the synchronous control circuit 190. The signal 2φ T indicates the image transmission clock which generates the one-clock horizontal synchronizing signal HSYNC by synchronizing the beam detect signal BD (which is released from the laser scanner per each scanner line) with the image transmission clock 2φ T. HSYNC is also the shift pulse SH which starts CCD reading. The signals φ1 and φ2 indicate the signals whose phase differs from each other and whose frequency is one-half the frequency of the image transmission clock 2φ T. Each of these signals constitutes a clock pulse which shifts the analog shift register pertaining to the even and uneven numbers of CCD.

VIDEO DATA is the image data signal from CCD, where the first image data D1 are read from the output of shift pulse SH, leading successively to D2, D3, ... and 4756 bits. D1 to D4 are the dummy picture elements of CCD, whereas the 4752 bits from D5 to D4756 constitute the one-line image data, and the CCD VIDEO EN becomes active during this 4756-bit section. The signal RS, produced at the trailing edge of image data, is the pulse that resets the CCD shift register per shift. The shading start signal SHDST is a signal coming in from the main unit controller 400 of this apparatus, but it rises only from the first active line of CCD VIDEO EN.

Explanation of the CCD light-receiving unit 200, shown in FIG. 4, is detailed as follows. The CCD light receiving unit 200 is made up of: the color separating prism 12 for 3-color separation; blue filter 13 for regulating the light intensity of B, G and R available from the color separating prism 12; green filter 15; red filter 17; CCD B-210 which receives the blue light; CCD G-220 which receives the green light; CCD R-230 which receives the red light; and CCD drivers B-240, G-250 and R-260 which digitize the analog valves of the complementary colors Y(yellow), C(cyan) and M(magenta) into digital guantity through A/D conversion of the output from the above devices. CCDs B 210, G 220 and R-230 are incorporated in CCD drivers B-240, G-250 and R-260, respectively.

Figures 1, 6:
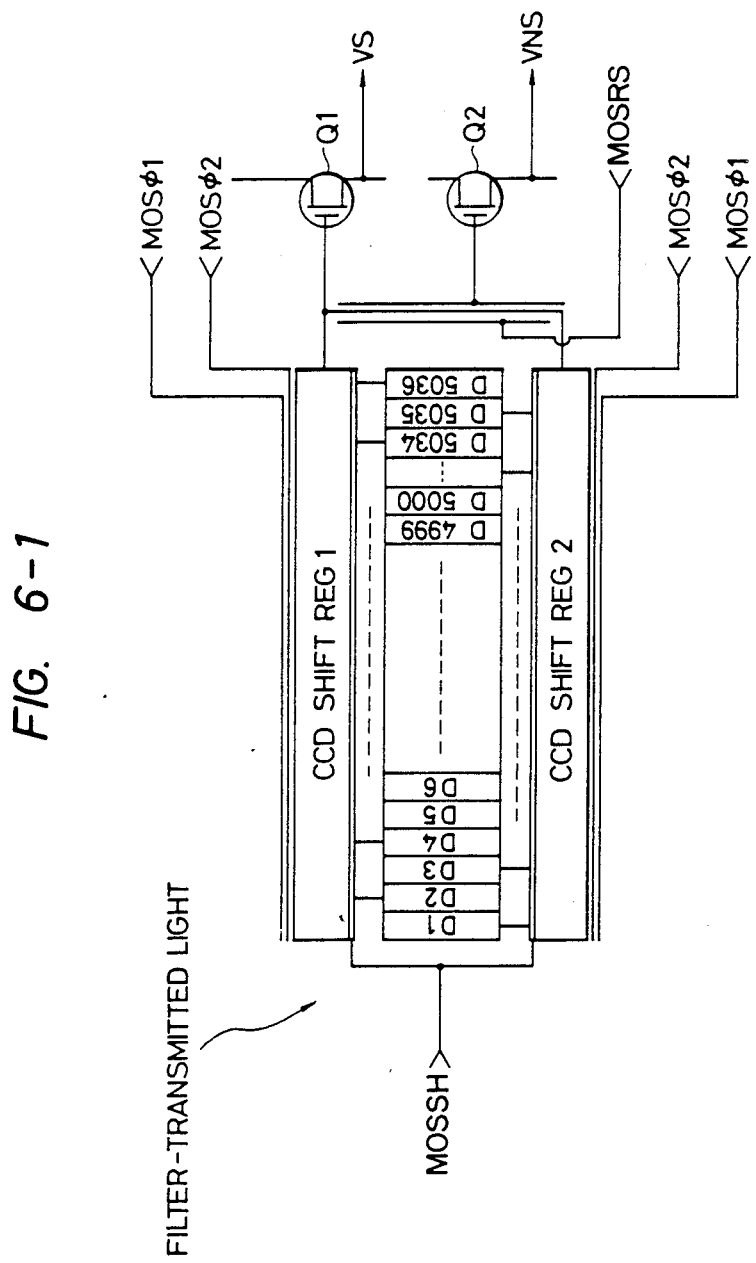
Figures 2, 6:
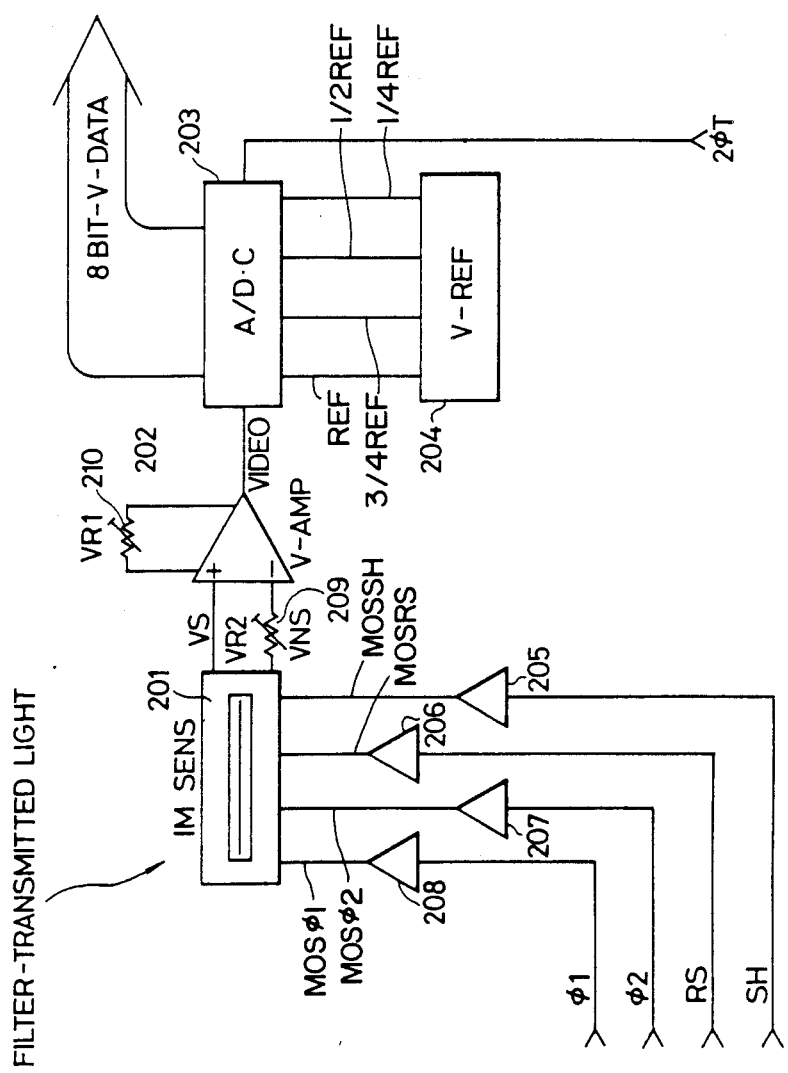

FIG. 6-1 shows the construction of each CCD. After passing through the infrared cut filter, color separating prism 12, and spectral correction filter, the original image is irradiated in the form of a slit image on the photodiode ranging between D1 and D5036. The photocurrent of the photodiode is stored in the charge storage unit (not illustrated) in the form of an electric charge which is proportionate to the irradiation time. This electric charge is shifted to the CCD analog shift registers 1 and 2, with the shift pulse SH being added. The CCD shift registers 1 and 2 receive a continuous pulse which has an antiphase consisting of MOS φ1 and φ2. The electric charge of the image, shifted from the charge storage unit of the photodiode, is transmitted in series to the output transistor circuit Q1, by means of the above clock pulse MOS φ1 and φ2, along the well of electric charge formed within the channel comprising the CCD shift registers 1 and 2.

Concurrently, a switching noise component produced by the reset signal RS, which corresponds to the above electric charge of the image, is supplied for the output transistor circuit Q2. Later, this switching noise component will be used to remove another switching noise component incorporated into the image electric charge. The image electric charge, which has been transmitted to the output transistor circuit Q1 by means of clock pulse MOS $\phi1$ and $\phi2$, is converted into the image voltage output VS at this point. The switching noise component corresponding to this is also converted into the switching noise voltage output VNS by means of the output transistor circuit Q2. In addition, every time an image charge undergoes voltage conversion after reading the output transistor circuit Q1, another reset pulse MOS RS is sent to the output transistor circuits Q1 and Q2, thereby preventing the image charge from accumulating in the output transistor circuit Q1.

FIG. 6-2 shows a block diagram of the CCD driver which converts the original image (a practical example of this invention) into an electric signal. Reference numeral 201 indicates the color separating prism 12 and CCD linear image sensor IM SENS by which the image light passing through a light intensity adjust filter is converted into an electric signal. Reference numeral 202 indicates the differential input video amplifier V-AMP which provides differential amplification for the image voltage output VS and switching noise voltage output VNS (both are released from the IM SENS 201), thereby preparing a correct image output voltage VIDEO. Reference numeral 203 indicates the video A/D converter, A/D-C, which converts the image output voltage VIDEO from an analog into a digital signal. Reference numeral 204 indicates the basic voltage source V-REF which supplies basic conversion voltage for the A/D converter 203 above. Reference numerals 205 to 208 indicate the pulse drive amplifiers which drive the IM SENS 201 to operate. Reference numeral 209 indicates the variable resistance VR2 which eliminates the DC voltage difference between the image voltage output VS (the output of IM SENS) and switching noise output VNS. Reference numeral 210 indicates the variable resistance VR1 which establishes the amplifying output of V-AMP.

In the circuits mentioned above, the image output VS and noise output VNS (released from IM SENS 201) are added to V-AMP 202 after their DC voltage level is equalized by VR2 at the time of a non light signal. Both VS and VNS are differentially amplified by V AMP 202, through VR1 210, thereby attenuating the noise component contained in VS which improves the image signal VIDEO so that it is suitable for processing by A/D-C 203.

In this embodiment, a simultaneous 3-color separation is implemented by the color separating prism 12, as discussed before. However, due to the characteristics of the light source and color separating prism 12, and because of the color sensitivity of a CCD linear image sensor within the CCD driver, the light input and output signals of the three CCD drivers B-240, G-250, and R-260 against B, G and R are adjusted by V-AMP 202 to precisely harmonize the output signals with the non-light conditions without becoming saturated when receiving the maximum quantity of light. They are also adjusted to have a proper dynamic range so that their gain is reduced in the order of B, G and R by selecting the resistance (VR1 and VR2) against B, G and R.

Conversion of the VIDEO signal from analog to digital is performed by A/D-C 203. The timing pertaining to conversion is subject to the image transmission clock $2\phi$ T sent from the address control unit 190-3. The digitized VIDEO signal is then transmitted to the image data processing unit 100, where it implements the various steps of image processing.

The characteristics of the light source and other factors can be corrected by adjusting the gain of the amplifier according to the the above mentioned method, i.e., in the form of B>G>R.

In this embodiment, the basic voltage such as REF, $\frac{3}{4}$ REF, $\frac{1}{2}$ REF, and $\frac{1}{4}$ REF is impressed in the high speed A/D converter A/D-C 203 at the output resistance whose level is lower than the basic voltage source V-REF 204. This is advantageous because it enhances linearity in the process of high-speed A/D conversion. Signals $\phi1$, $\phi2$ RS and SH, sent from the image data processing unit 100, are received by IM SENS 201 as a drive input after these signals are modified into proper drive voltage waveforms such as MOS $\phi1$, MOS $\phi2$, MOSRS, and MOSSH by means of the pulse drive amplifiers 205 to 208.

SHADING CORRECTION

Figures 1, 7:
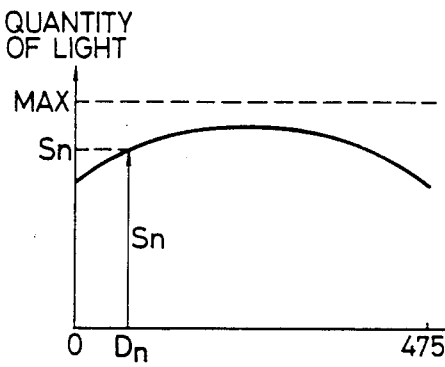
Figures 2, 7:
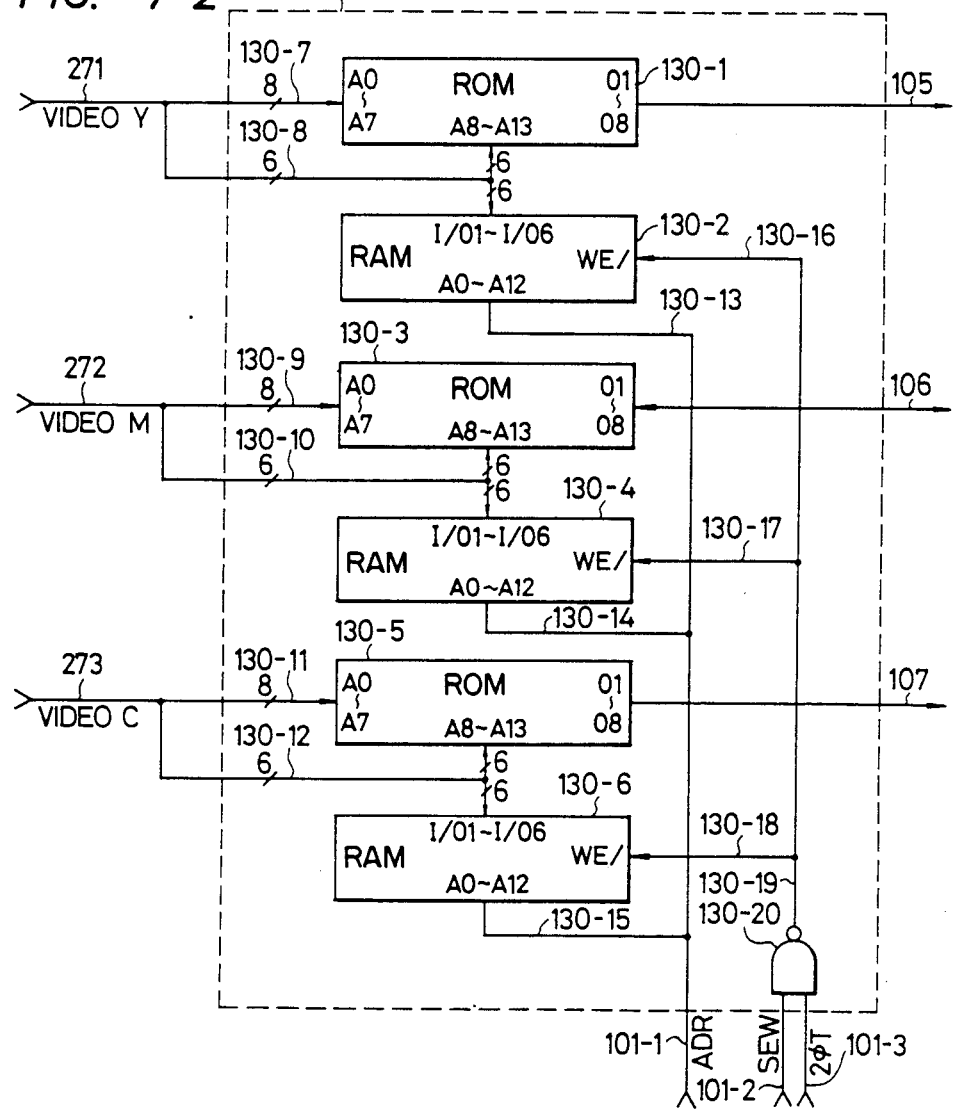

FIG. 7-1 diagrams the shading correction practiced in this example. The so-called "shading" implies an uneven optical image caused by various optical problems involving the light source, lens, and other factors. This occurs in the apparatus which reads out an image by applying a light source on an original and condensing its reflected image by lens. If the image data in the main scanning direction feature the values of 1. 2, ... n ... 4756 in FIG. 7-1, the quantity of light tends to be attenuated at both ends.

To implement shading correction, the following measures are devised in the case of the shading correction circuit 130. In FIG. 7-1, the legend MAX indicates the maximum value of image level, Sn indicates the image level at the nth bit when reading the white calibration plate 4, and Dn represents the image level at the time of continuous image reading. When implementing correction per bit, the corrected image level D'n can be expressed by the following equation:

$$D'n = Dn * MAX/Sn \qquad (4\text{-}1)$$

FIG. 7-2 is a detailed diagram of the shading correction circuit 130. Reference numerals 130 2, 130-4 and 130-6 indicate the shading RAM for one-line reading of the white calibration plate 4. Reference numerals 130-1, 130-3 and 130-5 indicate the shading correction ROM for providing correction output with reference to the shading data which have been stored in the shading RAM at the time of image reading.

The 8-bit image data from CCD drivers B 240, G 250 and R-260 are fed to the shading correction circuit 130 via signal lines 271, 272 and 273, respectively. First, the image data available from a one line reading of the white calibration plate 4 are stored in the shading RAMs 130-2, 130-4 and 130-6. At that time, the shading light enable signal SWE is fed to the signal line 101-2 from the address control unit 190-3 (FIG. 5-1). The image transmission clock $2\phi$ T is also input to the signal line 190-12, which is gated by the NAND gate 130-20. The output of the NAND gate 130 20 is connected via lines 130-16 through 130-19 to the light enable terminal WE/ of the shading RAMs 130 2, 130-4, and 130-6. The shading data can be accommodated by these RAMs only when a one-line reading of the white calibration is practiced in that instance, the address signal ADR 101-1 is controlled by the address control unit 190-3, and each shading RAM is designed to accommodate the image data of 4752 picture elements from the CCD output.

Image signals VIDEO Y, VIDEO M, and VIDEO C are output from the CCD light-receiving unit 200 to the signal lines 271, 272, and 273, respectively. Each of these signals is an 8-bit digital signal to be called "VIDEO 0 to 7" (from LSB to MSB) for each bit. When the shading data in this practiced example are accommodated in the shading RAMs 130-2, 130-4, and 130-6, it is only the 6-bit digital data VIDEO 1 to 6 that are memorized in each RAM as shading data per each picture element by way of the signal lines 130-8, 130-10, and 130-12. The reasons why 6-bit shading data have been adopted are that it reduces memory capacity and there is no radical fluctuation in shading characteristics.

When original scanning starts after accommodation of the shading data, the 8-bit data VIDEO 0 to 7 of the image data VIDEO Y, M, and C are input to the address terminals A0 to A7 of the shading correction ROMs 130-1. 130-3, and 130-5 via signal lines 130-7, 130-9, and 130-11. The 4752-bit shading data, stored in the shading RAMs 130-2, 130-4, and 130-6, are controlled by the address signal ADR 101-1, via lines 130-13, 130-14, 130-15, and the shading data from each of the shading RAMs 130 2, 130 4, and 130 6 is output to the address terminals A8 to A13 of the shading correction ROMs 130-1, 130-3, and 130-5 respectively, via terminals I/01 to I/06 for each of the shading RAMs, respectively. The shading light enable signal SWE 101-2 does not become active at this time, whereas the shading correction RAMs 130-2, 130-4, and 130-6 perform a lead action.

In the shading correction ROMs 130-1, 130-3 and 130-5, the ROM data are prepared so that an operation similar to the (4-1) equation, given above, shall be implemented. Access to the shading correction ROM is available if the 8-bit image signals VIDEO 0 to 7 and 6 bit shading data work as an address. The shading-corrected output can thereby be output from the terminals 01 to 08 in the form of an 8-bit image signal.

Shading correction shall be practiced for each scan of the original when the mode of multi-color superposition is employed.

This method of shading correction applies to all image data.

Y CORRECTION

Figures 1, 8:
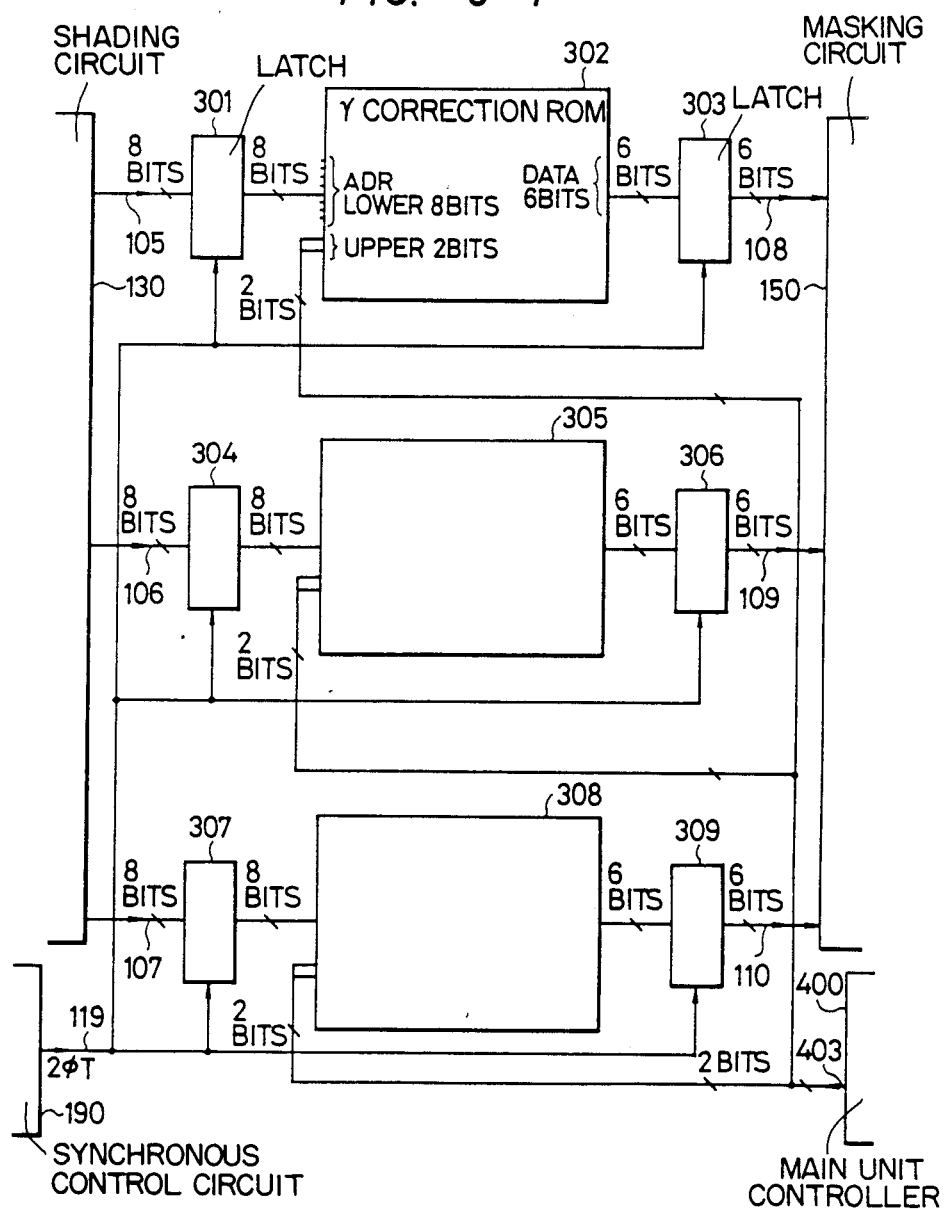
Figures 2, 8:
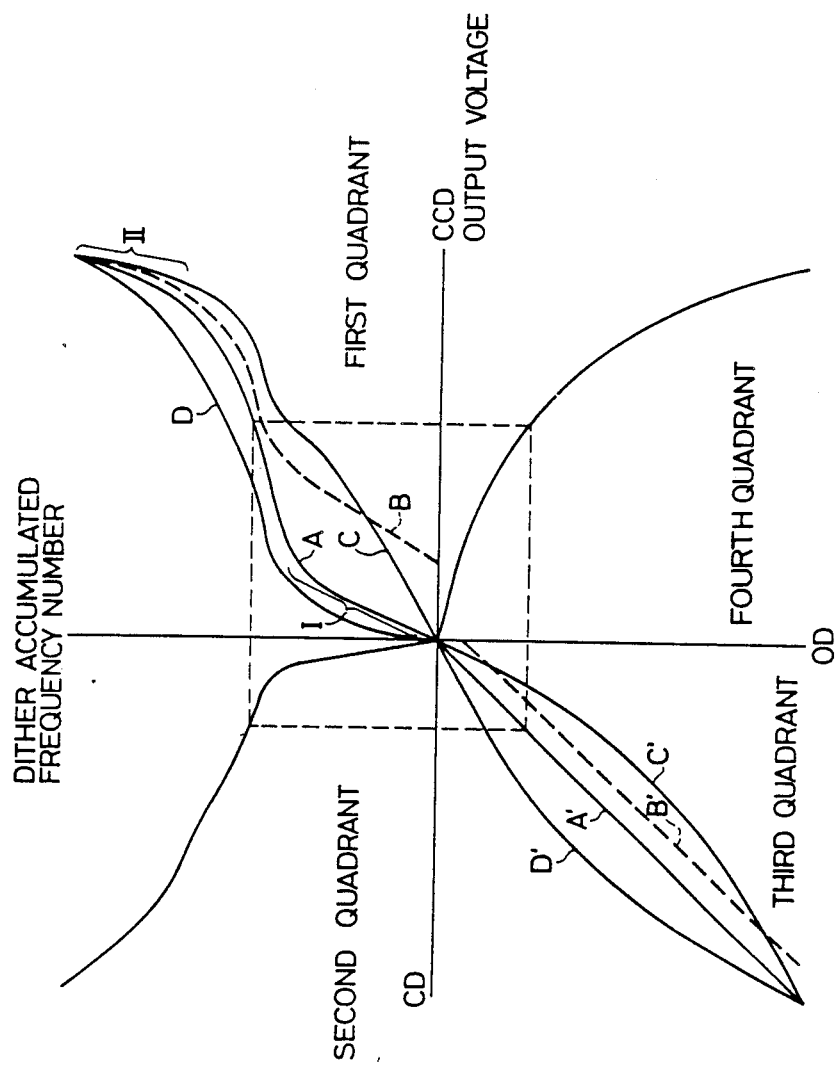

Explanation of the Y correction will now be provided. FIG. 8-1 is a detailed block circuit diagram of the Y correction circuit 140. This practiced example, in which the Y correction is implemented by means of the reference ROM for each color, features a construction where the characteristics can be selected optionally.

The 8 bit signal VIDEO Y, output from the shading correction circuit 130, is synchronized by the synchronizing signal $2\phi$ T which is put out on signal line 119 of the synchronous control circuit 190 to the latch 301. The synchronized output is fed to the lower 8-bit address of the Y correction ROM 302. The upper 2-bit address receives the input of Y correction select signal 403 sent from the control unit 400. The area of Y correction ROM 302 is selected according to the select signal 403.

The Y-value control switch 421-14 for Y (yellow) (FIG. 3—3) of the sub-control unit 421 (located within the main unit controller 400) is capable of being selected under four categories. This switch gives access to the high-speed digital signal which is fed to the upper 2-bit and lower 8-bit address of the Y correction ROM 302. The data previously memorized in the ROM 302 can thereby be released. Therefore, the data from the ROM feature a 6-bit level. These data are further synchronized by the synchronizing signal $2\phi$ T which is ouput to signal line 119 from the synchronous control circuit to the latch 303. The signal VIDEO Y is then output to the signal line 108 after going through Y correction in the masking processing circuit 150. Data conversion of the yellow (Y) signal component is thus accomplished by the Y correction ROM 302.

The image signals VIDEO M and C undergo similar steps of processing. After being sent out from the shading circuit 130 to the signal lines 106 and 107, the image signals VIDEO M and C go through synchronization at the latches 304 and 307 and enter the Y correction ROMs 305 and 308. Access to the area of the Y correction ROMs 305 and 308 is subject to the image signals VIDEO M and C as well as to the selection signals controlled by the Y value control switches 421-15 and 421-16 (FIG. 3-3) of the sub-control unit 421 which is located within the main unit controller 400. Output of the 6-bit Y corrected data are implemented through this access. These Y corrected signals VIDEO M and C undergo synchronization in the latch circuits 306 and 309 and then come out to the masking circuit 150 via signal lines 109 and 110.

Next explanation is concerned with: how to select the Y value control switches 421-14 to 421-16 which belong to the sub-control unit 421 of the main unit controller 400; and conversion table for the address input and output data pertaining to the Y correction ROMs 302, 305 and 308. In this case, the Y correction ROM 302 of the image signal VIDEO Y provides an example for the explanation.

When implementing Y correction, it is advisable establish a ratio of 1 to 1 between "OD" (density of a color original based on reading) and "CD" (density of a transfer paper based on depicting). In that case, there are three major factors (properties) that affect Y correction: properties of the CCD B 210 which reads the density of a color original; properties of the image processing unit 100 by which the signal from CCD is released in the form of laser-modulated signal; and density of the image depicted on a transfer paper by means of the laser-modulated signal. More detailed explanation is given to these factors by reference to FIG. 8-2.

In the fourth quadrant of FIG. 8-2, the axis of ordinates represents OD, while that of abscissas stands for the shading-corrected VIDEO Y. Since OD is given in logarithm, the image signal VIDEO Y features a logarithmic relation with the original density OD. This relation becomes fixed depending on the properties of CCD B 210 and CCD driver 240.

The second quadrant represents the relationship between CD and dither-accumulated frequency number. The dither accumulated frequency number implies the ratio between a certain entire area (in this case it indicates the dither matrix represented by the dither processing circuit 170 to be discussed later) and an inner partial area under development. The change of CD is subject to the change of the dither accumulated frequency number which ranges from 0 to 100 percent. At 0%, the CD remains white but as the dither accumulated frequency number enlarges gradually, the CD begins to show a sharp increase halfway, and ultimately, i.e., at 100% the CD becomes saturated at a certain degree of density. These tendencies become fixed depending on the properties of the photosensitive drum 24, yellow developer 36, and other devices. Accordingly, the relation between CD and OD becomes established in the third quadrant, if the characteristics of the image processing unit 100 are incapable of being changed in the first quadrant.

In the image processing unit 100, the relation between CCD output and dither-accumulated frequency number can be controlled particularly by the Y correction circuit 140 and dither processing circuit 170. However, the data handled by the dither processing circuit are the 6-bit data (as explained later), and therefore the quantum error enlarges if the non linear segment of the second and fourth quadrants is corrected. This is one of the shortcomings because the relation between CD and OD cannot be shown accurately even if the linearity is achieved.

The input and output data of the Y correction circuit 140 are 8-bit and 6-bit respectively, and therefore the quantum error diminishes in spite of correction. In the dither processing circuit 170, the characteristics pertaining to the first quadrant become fixed depending on the data stored in the Y correction ROM 302, if there is a linear correlation between the signals from the UCR processing circuit 160 and those released as the dither-accumulated frequency number. Therefore, if the relation between CCD output and dither-accumulated frequency number in the first guadrant acquires the characteristics of A through Y correction, then the relation between CD and OD in the third quadrant may be established at the ratio of 1 to 1 like A'.

Details of the Y correction ROM 302 are given in Table 1, which follows, as a practical example. Its characteristics are shown by the upper 2 bits of address, where "00" indicates A, "01" B, "10" C, and "11" D. When the yellow image signal VIDEO Y is put in the lower 8 bits, the 6-bit data will be put out as shown in Table 1. In this way it is possible to achieve a 1 to 1 ratio between CD and OD. As in the case of B' in the third quadrant, the characteristics of copy density such as lowering CD, highly contrasting C', slightly covering D', and so on, can also be controlled by choosing the Y correction switch 421-14 of the sub-control unit 421.

Quick and accurate copying is thus realized by implementing Y correction for the characteristics of yellow signal. This also applies to magenta (M) and cyanogen (C) signals, whose characteristics are also subject to free selection.

TABLE 1

| Upper 2 bit address | Lower 8-bit address | Data Output |
|---|---|---|
| 00 | 00000000 | 000000 |
|  | 00000001 | 000010 |
|  | 00001110 | 010001 |
|  | 00011010 | 010110 |
|  | 11111000 | 110000 |
|  | 11111110 | 111100 |
|  | 11111111 | 111111 |
| 01 | 00000000 | 000000 |
|  | 00010000 | 000000 |
|  | 11111111 | 111111 |

The relation between CCD output and dither-accumulated frequency number is also controllable by both the Y correction circuit 140 and dither processing circuit 170. Since there is no linear correlation between OD (density of original) and VIDEO Y (signal released after shading correction), it is necessary to implement signal conversion based on a previously mentioned method so that OD becomes proportional to VIDEO Y, whose signal has been corrected by the Y correction ROM 302. The dither processing circuit 170, for which the Y-corrected VIDEO signal has been supplied via signal line 114, may also be corrected by the dither processing circuit mentioned later so that the CD density becomes proportional to the VIDEO signal.

MASKING

Figures 1, 9:
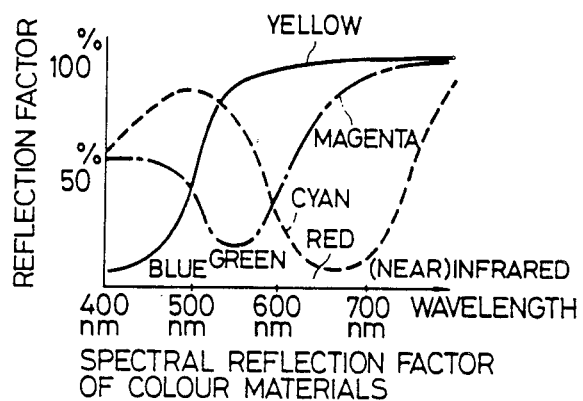
Figures 2, 9:
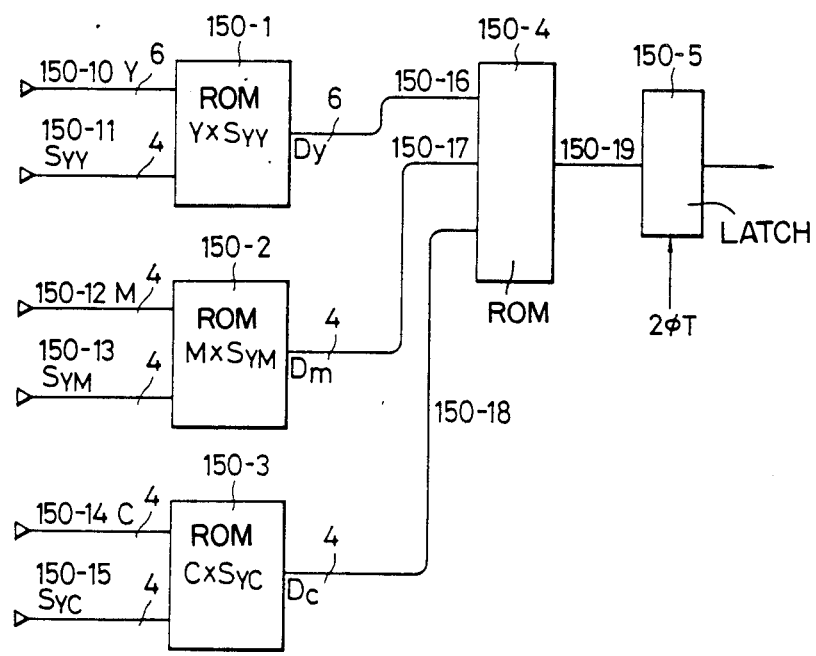

Color materials such as toner, printing ink, etc. have the spectral reflection factor shown in FIG. 9-1. The yellow (Y) color material absorbs the light of 400 to 500 nm and reflects that of 500 nm or more. The magenta (M) color material absorbs the light of 500 to 600 nm and reflects others, while the cyan (C) color material absorbs the light of 600 to 700 nm and reflects others.

When performing development with the Y color material, it is necessary to perform it on a latent image formed through the optical image in which the light reflected from the original is color separated by a blue (B) filter featuring the spectral transmission factor shown in FIGS. 2–4. Likewise, it is necessary to use green (G) and red (R) filters for development with the M and C color materials, respectively.

As is evident from both figures, each of the filters B, G and R features a relatively good separation of color components above 500 to 600 nm, whereas the spectral reflection factor of color materials shows a bad separation depending on wavelength. M (magenta), in particular, contains a sizable guantity of Y (yellow) and C (cyan) components. C also contains a little M and Y components. Consequently, a copied color picture tends to become turbid as it involves unnecessary color components, if development is performed with the above color materials based on an optical image which has undergone simple color separation.

In ordinary printing technology, therefore, a masking processing method is employed to make up for these drawbacks. In the masking processing system, the output color components Yo, Mo and Co are expressed by the following formulas, with Yi, Mi and Ci representing the input color components:

$$\begin{vmatrix} Yo \\ Mo \\ Co \end{vmatrix} = M \begin{vmatrix} Yi \\ Mi \\ Ci \end{vmatrix} \qquad (1)$$

$$M = \begin{vmatrix} a_1 & -b_1 & -c_1 \\ -a_2 & b_2 & -c_2 \\ -a_3 & -b_3 & c_3 \end{vmatrix} \qquad (2)$$

These lead to the following formulas, thereby implementing conversion:

$$Yo = a_1 a_1 Yi - b_1 Mi - c_1 Ci \qquad (3)$$

$$Mo = -l_2 Yi + b_2 Mi - c_2 Ci \qquad (4)$$

$$Co = -a_3 Yi - b_3 Mi + c_3 Ci \qquad (5)$$

Turbidity of a picture can be corrected by applying relevant coefficients ($a_i$, $b_i$, $c_i$) (i=1, 2, 3) to the above formulas.

Figures 1, 10:
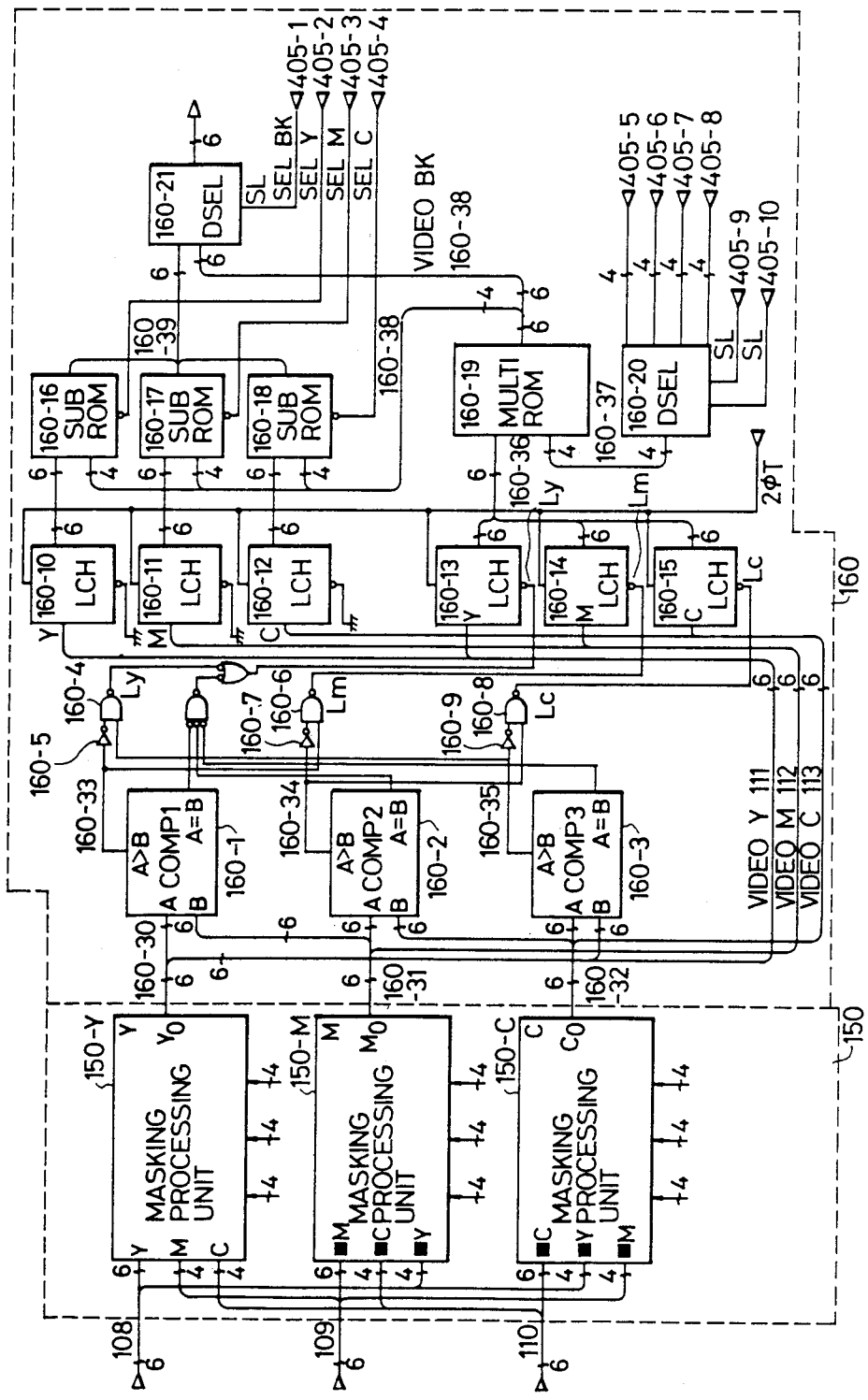
Figures 2, 3, 10:
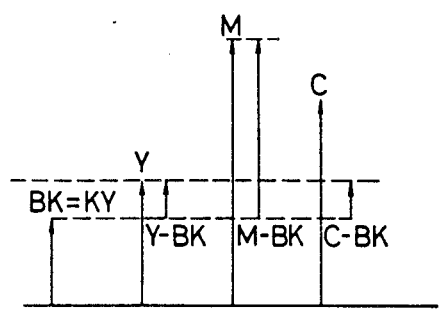

FIG. 10-1 is a detailed diagram of the masking processing circuit 150 and UCR processing circuit 160. In this figure, 150-Y, 150-M and 150-C indicate the masking processing units corresponding to the image signals Y (yellow), M (magenta), and C (cyan).

In the masking processing unit 150-Y, the formula (3) above is realized by Yi, Mi and Ci, each of which corresponds to: the 6-bit Y-component video signal VIDEO Y released via signal line 108; upper 4 bits of the 6-bit M-component video signal VIDEO M released via signal line 109; upper 4 bits of the 6-bit C-component video signal VIDEO C released via signal line 110. Mi and Ci in the formula (3), Yi and Ci in the formula (4), and Yi and Mi in the formula (5) are the color data for correcting. These color data for correcting do not require higher accuracy than the color data for being corrected (Yi, Mi and Ci). The coefficients (ai, bi) (i=1, 2, 3), which range over 16 steps (1/16, 2/16 ... 1) as explained later, are reduced to 4 bits against 6 bits of the data for being corrected (Yi, Mi and Ci). The capacity of ROM for conversion can thereby be reduced to ¼.

FIG. 9-2 is a detailed block circuit diagram pertaining to the masking processing unit 150-Y in FIG. 10-1. Explanation of the masking processing units 150-M and 150-C is omitted since they feature the same circuit as above.

By means of the digital code switches 421-5 to 421-13 located over the sub-control unit 421 (FIG. 3—3), the following data are sent into the masking processing unit shown in FIG. 9-2. The 6-bit data Y via signal line 150-10; 4-bit data M via signal line 150 12; 4-bit data C via signal line 150 14; and 4-bit code data S-YY, S-YM and S-YC established by users via signal lines 150-11, 150-13 and 150-15. Based on the formula (3) with coefficients ai, bi and ci, the coefficient of the code data S-YY, S-YM and S-YC ($[O]_H \sim [F]_H$) turns out N/16, with the value of digital code switches 421-5 to 421-13 being set at N.

Numbers 150 1, 150-2 and 150-3 indicate the ROMs to be used for operation. 150-1 stands for the 6-bit signal Y. The 4-bit code data S-YY forms the address for each ROM. With the ROM data being defined by that address and the 4-bit value being set at m, the data expressed by the following equation are accommodated in 6 bits:

$$D_y = Y_6 \text{bit} \times m/16 \ (Y = O_H \sim 3F_H, m = O_H \sim F_H)$$

Under the set value n and 4 bit code data S-YM, the following equation applies to 150-2:

$$D_m = M_4 \text{bit} \times n/16$$

Under the set value 1, the following equation applies to 150-3:

$$D_c = C_4 \text{bit} \times 1/16$$

Both $D_m$ and $D_c$ represent 4-bit data in the above equations. The data Dy, Dm and Dc, available from the above equations, will be sent to the signal lines 150-16, 150-17 and 150-18 respectively. Application of these data to the formula (3) brings the following equation:

$$D = D_y - D_m - D_c$$

If the value found from the above equation constitutes the video data for Y, the correction of Y can be implemented by applying the formula (1). The 6-bit data Y and 4-bit correction data M and C are connected to the address path of the operation ROM 150-4, thereby providing a prescribed operation value for ROM table reference. 150-5 indicates a latch element that synchronizes with the video transmission clock 2φ T to latch the 6-bit data which have undergone numerical operation for masking processing. Correction of M and C is similarly implemented in 150-M and 150-C.

UCR PROCESSING

FIG. 10-1 shows the details of the UCR processing circuit. Equal quantities of Y, M and C, for example, may be superposed in the case of color reproduction by mixing color materials based on the subtractive mixture method. In that case, the color materials being used absorb all spectral components being separated, thereby reproducing the black (BK) color. In the BK area of the original, therefore, the toner of Y, M and C overlaps in equal quantities.

However, the spectral reflection factor applying to the toner of Y, M and C features deficient color separation caused by wavelength, as evident from FIG. 9-1. As mentioned already, the Y toner contains a little M component and the M toner contains a sizable guantity of Y and C components. Therefore, color reproduction for the BK component must be performed by means of the BK toner. In the area where BK is applied, it suffices to reduce the guantity of toners correspondinq to Y, M and C. This method is called UCR (elimination of under colors), which is implemented in the block 160 of FIG. 10-1.

The 6-bit image data for Y, M and C are released from the masking circuit 150 by way of the signal lines 160-30, 160-31 and 160-32. These data first undergo large-small comparison between Y and M, M and C, and C and Y by means of the comparators 160-1, 160-2 and 160-3, respectively. The large-or-small comparison by these comparators is intended to latch the smallest value among the image data Y, M and C in the latch circuits 160 13, 160 14 and 160 15.

Depending on the size of those image data, the signals as shown in the table of FIG. 10-2 will be sent out the signal lines 160-33, 160-34 and 160-35. Upon comparison of the image data Y, M and C per picture element, "0" will be released to the signal line 160-33 and "1" to 160-35, when Y is the smallest. The signal lines 160-33 and 160-35 are connected to a logic circuit, which includes a logic inverter 160-5 and a logic NAND 160-4, that outputs a latch enable signal $L_y$. When Y is a minimum, latch enable signal $L_y$ enables the latch 160-13 to latch the image data Y.

Likewise, "1" will be released to the signal line 160-33 and "0" to 160-34, when M is the smallest. The signal lines 160-34 and 160-33 are also connected to a logic circuit, which includes a logic inverter 160-7 and a logic NAND 160-6, that outputs a latch enable signal $L_m$. The latch enable signal $L_m$ enables the latch 160-14 to latch the image data M if M is a minimum. "1" will be released to the signal line 160-34 and "0" to 160-35, when C is the smallest. The signal lines 160-35 and 160-34 are connected to a logic circuit, which includes a logic inverter 160-9 and a logic NAND 160-8, that outputs a latch enable signal $L_m$. If C is a minimum, the latch enable signal $L_c$ enables the latch 160-15 to latch the image data C. When Y, M and C are all equal to each other (Y=M=C), the value of Y shall represent them all.

The smallest value, established by the above three comparators, is put out to the signal line 160-36 through the latch circuits 160-13, 160-14, and 160-15, and thereafter it constitutes the basic data for black ink supply. Image data Y, M, and C, released from the masking circuit 150 are latched by other latch circuits 160-10, 160-11, and 160-12 at the leading edge of the image transmission clock 2φ T, and then output to the subtractive operation ROMs 160-16, 160-17, and 160-18 at the next stage. By means of the multiplication ROM 160-19, the above basic data (BK) for ink supply which have been put out to the signal line 160-36 are multiplied by the 4-bit coefficients fed to the signal line 160-37 through the selector 160-20. The upper 4 bits of the 6-bit values (K×BK), resulting from this multiplication, are output to the subtraction ROMs 160-16, 160-17, and 160-18 by way of the signal line 160-38. The subtraction ROMs 160-16, 160-17, and 160-18 subtract these values from each of the image data and send out the results to the selector 160-21 by way of the signal line 160-39. The selector 160-21 takes in the 6-bit ink supply data from the multiplication ROM 160-19 through the signal line 160-38.

These image signals are released from the selector 160-21 in the form of 6-bit signals after the required image data are selected by the discrimination signals SEL BK (where SL corresponds to SEL BK) Y, SEL M, and SEL C (which discriminate Y, M, C and BK) which are sent from the main unit controller 400 through the signal lines 405 1, 405 2, 405-3, and 405-4. In the case of full-color mode involving four colors (Y, M, C and BK), the final output, having undergone the masking and UCR processing, goes through the selection signals SEL Y, SEL M, SEL C, and SEL BK per scan, which select the image data whose color has been modified in the order of Y, M, C, and BK.

The coefficients to be multiplied by the basic data of BK are selected by a series of switches 421-1 to 421-4 which are located within the sub control unit 421 of the main unit controller 400 shown in FIG. 3-3. These coefficients are fed to the multiplication ROM 160-19 after being selected in a similar way by the selection signals SL 405-9 and SL 405-10 of the above switches released from the system control unit.

In the UCR circuit 160 of this practiced example, as explained before, the black ink supply is implemented on the basis of the value BK which has been found through multiplication of the coefficient k by the smallest value (Y, for example) of the picture elements containing a color component as shown in FIG. 10-3. The ultimate color components of Y, M, and C, resulting from operation, are (Y - BK), (M - BK), and (C - BK) respectively.

MULTI-GRADATION

Figures 11A, 11B:
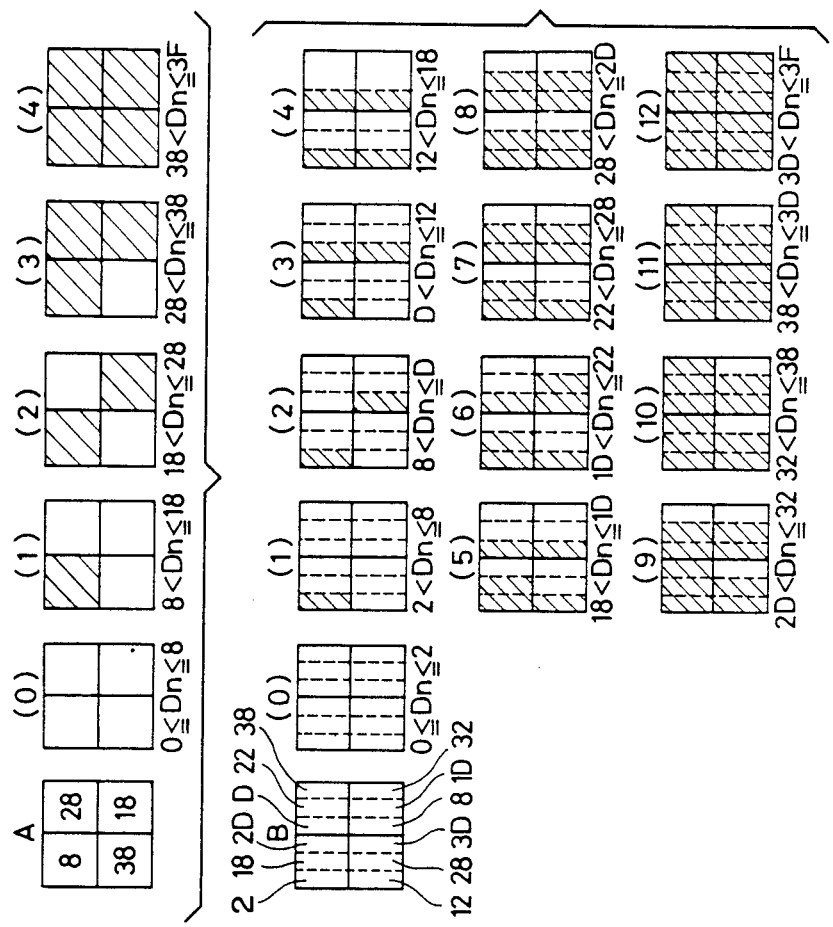
FIGS. 11A and 11B illustrate the principle of multi-gradient processing.

FIGS. 11A and 11B diagram the multi-gradation processing of this practiced example. The multi-gradation processing in this practiced example is made up of dither and multi-value processings. An example of dither processing is given in FIG. 11A. In dither processing, the 2-value version of the 6-bit and 64-level (0 to 3F) digital image signals is brought by changing the threshold in a certain area, thereby achieving the gradation based on an areal ratio of the dot number within that area (hereinafter referred to as "dither matrix").

In FIG. 11A-A, the threshold is changed from 8 to 18, 28, and 38 per bit in a 2×2 dither matrix. Against the values 0 to 3F of the digital image signal Dn, five different gradations are attained as shown in A-(0) to A-(4) of FIG. 11A, with "0" standing for the white block and "1" for the block with oblique lines according to 2-value signals.

Figure 13:
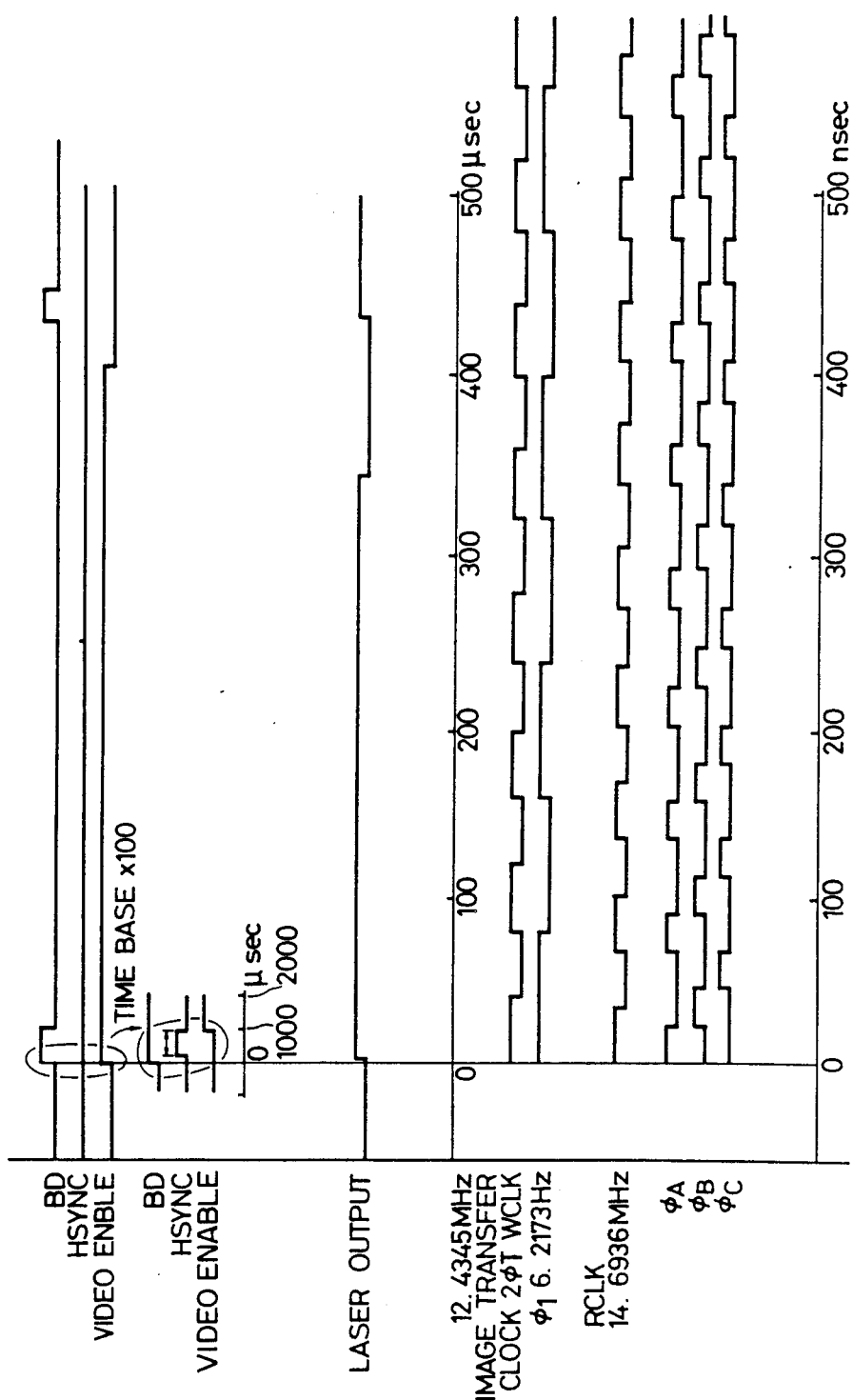
FIG. 13 illustrates a timing chart of signals in the circuit shown in FIG. 12-1 and FIG. 12-2.

The larger the dither matrix, the greater the gradation number, but pictorial resolution declines to the contrary. In this invention, therefore, the gradient features are enhanced through pulse width modulation, with a picture element being further divided. FIG. 11B shows an example where 4-value dither is implemented through 3-divisional pulse width modulation. Here, a dot is divided into three parts or micropixells by a perforated line, as illustrated in the figure. That is to say, an areal ratio consisting of four gradations is available per dot. As illustrated in FIG. 11B-B, 13 gradations B-(0) to B-(12) are achieved by giving three more threshold levels to each dot of the 2×2 dither matrix.

In the 2-value signal under multi-gradation, therefore, a picture of good gradating characteristics is realized by emitting laser light to only the blocks with oblique lines as shown in FIG. 11B. In the case of 3-value dither matrix, a matrix is produced by dividing a dot into two parts or micropixels. As for this practiced example, the dither matrix is variable from 2×2 to 32×32, where multi-value performance may be chosen from among 2-value, 3-value, and 4-value steps by means of the switch 421-24 (FIG. 3-3) in the sub-control unit 421. A variety of gradation can be achieved through combination of these steps. Moire and other factors can also be reduced by altering the dither matrix for each color.

Figures 1, 12:
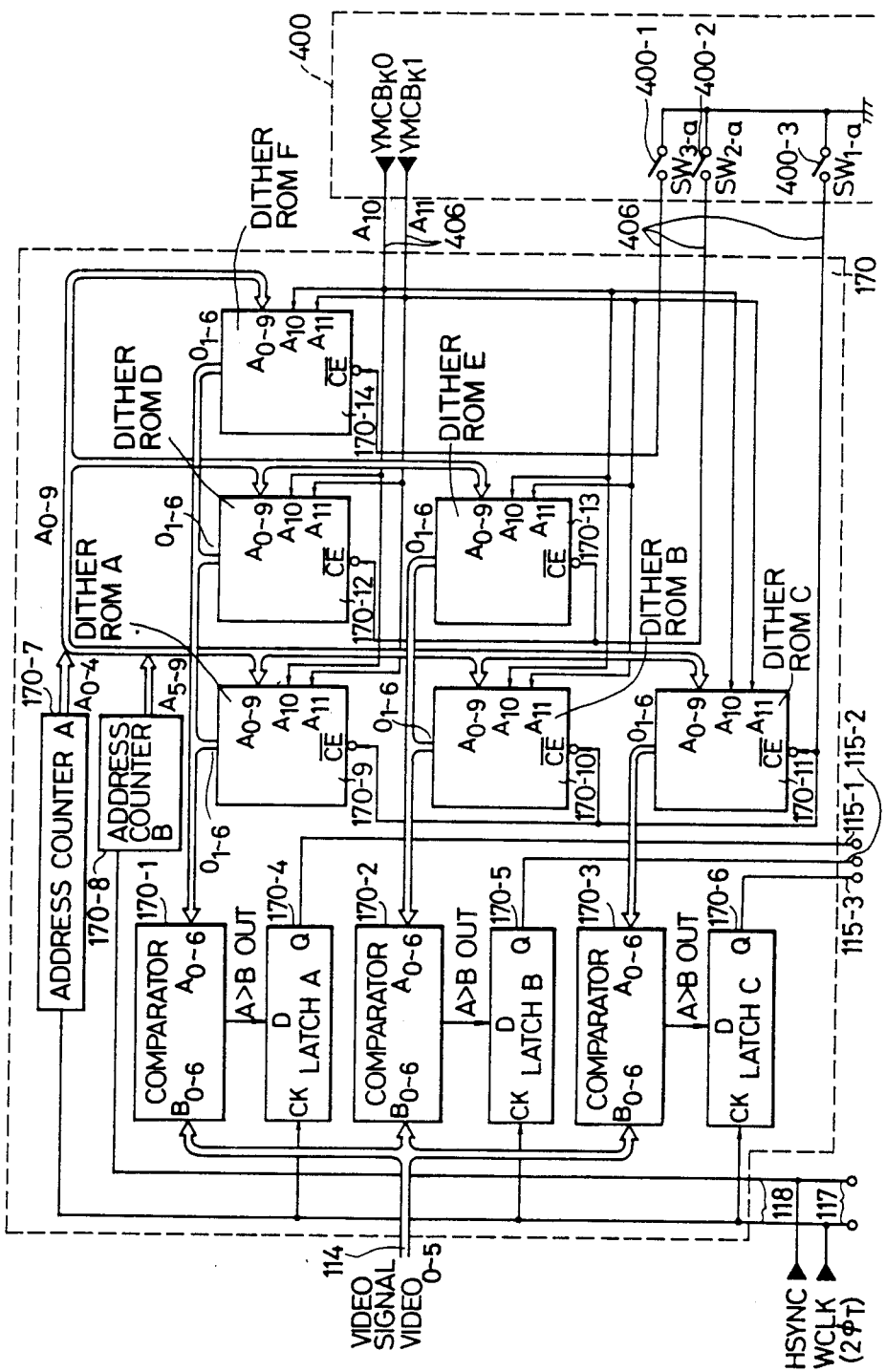

FIGS. 12-1 and 12-2 are the detailed block circuit diagrams illustrating the dither processing circuit 170 and multi-value processing circuit 180. Colors that require dither processing are determined by the 2-bit signals YMC BK-0 (A10) and YMC BK-1 (A11) which are sent from the main unit controller 400 via signal line 406 (FIG. 4). Examples are given below.

| Y (yellow)   | in case of A10 = 1 and A11 = 1 |
| M (magenta)  | in case of A10 = 1 and A11 = 0 |
| C (cyanogen) | in case of A10 = 0 and A11 = 1 |
| BK (black)   | in case of A10 = 0 and A11 = 0 |

Switches SW 1 to 3 are intended to select gradating characteristics and there are two contacts (a and b) in these switches. A dot of the dither matrix can be divided into three segments by turning on the switch SW 1. A dot of the dither matrix can be divided into two segments by turning on the switch SW 2.

As an example, there is a case featuring: A10=1; A11=1; SW 1 on; SW 2 off; and SW3 off. The dither ROMs A to C will be selected in this case. (Similarly, if SW 2 is on then dither ROM D 170-12 and dither ROM E 170-13 are selected; and if SW 3 is on, then dither ROM F 170-14 is selected). Under the conditions where 6-bit (64-level) video signal is applied, the following dither patterns shall be stored in the address of each dither ROM. Dither ROM A 170-9: 00 in address 00, 03 in 01, 06 in 02, 09 in 03, 12 in 20, 15 in 21, and so on. Dither ROM B 170-10: 01 in address 00, 04 in 01, 07 in 02 and so on. Dither ROM C 170-11: 02 in address 00, 05 in 01, 08 in 02, and so on. Instead of performing comparison between the threshold of image data and dither pattern by storing dither patterns in each dither ROM, there is another dither processing method where dither converted data are stored in a memory beforehand, and access is given to that memory, with the input image data functioning as address.

Circuit operation under the above conditions is explained as follows.

When the video signals VIDEO 0 to 5 indicate 04 under these conditions, the output Q of latch A is "1" since the video signals are greater if compared, using comparator 170-1, with the content 00 at the address 00 of the dither ROM A. The output Q of latch B is also "1" since video signals are greater, as determined by comparator 170-2, than the content 01 at the address 00 of the dither ROM B. The output Q of latch C is also "1" since video signals are greater, as determined by comparator 170-3, than the situation 02 at the address 00 of the dither ROM C.

The output Q of latch A is "1" as compared with the situation 03 at the address 01 of the dither ROM A because the video signals synchronize with the next image transmission clock WCLK. The output Q of latch B is "0" because the video signals are egual to the situation 04 at the address 01 of the dither ROM B. The output Q of latch C is "0" as compared with the situation 05 at the address 01 of the dither ROM C.

In this way, the output Q of the latches A, B, and C becomes "0" or "1" depending on the results of comparison, as determined by comparators 170-1, 170-2, and 170-3, with the situations at the addresses 02, 03, 00, 01, 02, 03, and 00 of each of the dither ROMs A, B, and C in synchronization with WCLK. If the signal HSYNC comes in at that time, the address counter B 170-8 counts up one, causing synchronization with WCLK, and then comparison with the situation is performed successively at the addresses 20, 21, 22, 23, and 20. That is to say, under synchronization with the image transmission clock WCLK, the address counter B 170-8 (upper address) (0 x address−3 x address) counts up every time the address counter A 170-7 (lower address) (x 0 address−x 3 address) counts up and HSYNC comes in.

In that instance, the output of the latches A 170-4, B 170-5, and C 170-6 is stored in the line memories A 180-9, B 180-10, and C 180-11 respectively because the address of the line address counter C 180-7 counts up under synchronization with the image transmission clock WCLK. If the signal HSYNC comes in at that time, the output of the latches A 170-4, B 170-5, and C 170-6 is stored in the line memories D 180-12, E 180-13, and F 180-14, respectively, because the address of the line address counter D 180-8 counts up under synchronization with WCLK. While being stored successively in the line memories D 180-12, E 180-13, and F 180-14 in synchronization with WCLK, the content previously stored in the line memories A 180-9, B 180-10, and C 180-11 is sent successively to the data selector 180-15 because the address of the line address counter C 180-7 and lead address counter 180-5 counts up in synchronization with the signal RCLK released from the oscillation circuit 180-3.

In order to form an image on a fixed spot over the drum, it is necessary, in the above conditions, to delay the start of image formation for a certain length of time after the input of HSYNC address counter 180-5 is prohibited until this delay reaches the time equal to the value established by the left margin counter 180-6. In other words, the information stored in the line memories A, B, C or D, E, F can be sent out to the data selector 180-15 only after the prohibition terminates.

Each time the signal HSYNC comes in, the input of the data selector 180-15 undergoes alternate changeover to A and B implemented by the changeover circuit 180-2. Therefore, the output terminals of the data selector 180-15 are always sending out the signal which, in synchronization with RCLK, has been stored in either of the line memories A 180-9, B 180-10, and C 180-11 or line memories D 180-12, E 180-13, and F 180-14.

As illustrated in FIG. 13, the image transmission clock WCLK is divided into three signals $\phi A$, $\phi B$, and $\phi C$ by the multi-value oscillation circuit 180-16. The multi-value oscillation circuit 180-16 sends these three signals to the AND gates A 180-17, B 180-18, and C 180-19 respectively, if its contact SW$_{1-b}$ (400-6) is turned on. As a result, the outputs Y0, Y1, and Y2 having synchronized with the RCLK of the data selector 180-15 are gated at the AND gates A, B, and C respectively. This result is then put in the OR gate 180-20, whose output signal turns on the laser. Depending on the magnitude of the signals VIDEO 0 to 5 which have been fed into the comparator during the one wave of WCLK, the emission of laser light can be varied under four different patterns: (1) not emitted at all; (2) emitted for one-third of the time of RCLK; (3) emitted for two thirds of the time of RCLK; and (4) emitted for a time period RCLK.

The time chart pertaining to the above-mentioned signals is given in FIG. 13. Explanation of these signals runs as follows:

BD

Released every time the laser light scans over the drum.

HSYNC

Becomes H only while the first $\phi 1$ remains H after BD has become H.

VIDEO ENABLE

Only while this VIDEO ENABLE remains H, the video signal dither-processed at the line memory is stored in the line memory.

LASER OUTPUT

Only while this laser output remains H, the laser light modulated on the drum is emitted.

IMAGE TRANSMISSION CLOCK (WCLK 2$\phi$ T)

Under synchronization with this WCLK, the dither-processed video signal is stored in the line memory.

$\phi 1$

Under synchronization with this $\phi 1$, a signal is taken out of the line memory.

$\phi A$, $\phi B$, $\phi C$

Under synchronization with $\phi 1$, the signal taken out of the line memory is divided into three by these $\phi A$, $\phi B$ and 100 C.

The following explanation concerns with the case where the area subject to laser emission, during one wave of the image transmission clock WCLK, is varied under three different patterns. In this case, the switches SW1, SW2, and SW3 are OFF, ON and OFF, respectively. Other conditions are the same as in the case of SW1 ON, SW2 OFF, and SW3 OFF. Dither ROMs D 170-12 and E 170-13 are selected under these conditions.

The function of the right address counter 180-1, read address counter 180-5, left margin counter 180-6, changeover circuit 180-2, line address counter C 180-7, and line address counter D 180-8 is the same as in the case discussed before, and therefore explanation of these devices is omitted now.

The results of comparison between VIDEOs 0 to 5 and dither ROM D 170-12 are sent into the terminal Ao (or Bo) of the data selector 180-15 by way of the latch A 170-4 and line memory A 180-9 (or line memory D 180-12). Likewise, the results of comparison between VIDEOs 0 to 5 and dither ROM E 170-13 are sent into the terminal A1 (or B1) of the data selector 180-15 by way of the latch B 170-5 and line memory B 180-10 (or line memory E 180-13). When $SW_{2-b}$ is On, the signal RCLK is divided into two signals 100 A and 100 B by the multi-value oscillation circuit 180-16, as illustrated in FIG. 13, but 100 C remains 0 in the mean time. As a result, the outputs Y0 and Y1, synchronized with RCLK of the data selector 180-15, are gated at the AND gates 180-17 and 180-18.

Then, logic OR operation is effected at the OR gate 180-20, and the laser is turned on by this signal. Now, depending on the magnitude of the signals VIDEO 0 to 5 which have been fed into the comparator during one wave of the image transmission clock WCLK, the emission of laser light can be varied under three different patterns: (1) not emitted at all; (2) emitted for one-half of the time of RCLK; and (3) emitted for a time period RCLK.

The following explanation is concerned with the case where the area subject to laser emission, during one wave of the image transmission clock WCLK, is varied under two different patterns. In this case, the switches SW1, SW2, and SW3 are OFF, OFF, and ON respectively. Other conditions are the same as in the cases of SW1 ON, SW2 OFF, and SW3 OFF. Dither ROM F 170-14 is selected under these conditions. The function of the right address counter 180-1, read address counter 180-5, left margin counter 180-6, changeover circuit 180-2, line address counter C 180-7, line address counter D 180-8 is the same as in the case explained before.

The results of comparison between VIDEOs 0 to 5 and dither ROM F 170-14 are sent into the terminal Ao (or Bo) of the data selector 180-15 by way of the latch A 170-4 and line memory A 180-9 (or line memory D 180-12).

In the multi-value oscillation circuit 180-16, on the other hand, 100 A is "1", $\phi B$ "0", and $\phi C$ "0", all remaining unchanged when SW 3-b is ON. Therefore, Y0 synchronizes with RCLK and bypasses the AND gate 180-17. Next, logic OR operation is effected at the OR gate 116, and the laser is turned on by this signal. Now, laser goes on and off in accordance with the magnitude of the signals VIDEO 0 to 5 which have been fed into the comparator in one wave of WCLK.

The type of originals is roughly grouped into three categories: (1) pictures only; (2) letters only; and (3) both pictures and letters. Pictures are further divided into those such as photographs featuring a delicate tone of color and those such as comic strips and line drawings (for coloring) involving almost primary colors only. As for photographic originals, accurate reproduction of various delicate colors is realizable through enhancement of gradation by multi-value processing.

As for comic strips and line drawings in which almost primary colors alone are involved, clear and unclouded color reproduction is realizable through 2-value processing As for letter originals, distinct pictorial expression free from half-tone density is practicable, thereby reproducing an optimal image through changeover of switches (SW 1 to 3) depending on the type of originals.

The on-off operation of the switches SW 1 to 3 is implemented through changeover of the switch 421-24 in the sub-control unit 421. Switches SW1, SW2, and SW3 are designed to be on at dials 4, 3, and 2 of the switch 421-24.

The apparatus introduced in this practiced example is designed to record images by means of laser beams, but application is not confined to this. It is also applicable to thermal printers, ink jet printers, etc. Some items of this invention are applicable to black and white image processings, as well as color images.

Either of the masking or UCR processings may be implemented first. It is allowable to use the B, G, and R signals transmitted from the memories of a host computer. It is allowable to read out the Y, M, C, and BK data after they have been stored in the page memory. Images may be either recorded on a transfer paper or filed in a disc. Multi-gradation is performed by time division signals in this practiced example, but it may also be performed through luminance modulation.

What we claim is:

1. An image signal binarizing process comprising the steps of:
   inputting an image signal representative of an image;
   providing a threshold pattern formed by a plurality of pixels, each of said pixels corresponding to a different pixel of the image represented by said image signal;
   dividing each pixel of said threshold pattern into a plurality of micropixels, each pixel having the same number of micropixels;
   setting a different threshold value for each of said micropixels;
   processing said image signal in accordance with said threshold values of said micropixels to produce a binary image signal; and
   selecting the number of micropixels in one pixel;
   wherein the size of said micropixels in each pixel is reduced as the number of micropixels increases.

2. The process according to claim 1, wherein the arrangement of the micropixels in a pixel is the same arrangement for all pixels.

3. The process according to claim 1, wherein said image signal is a color image signal having a plurality of color component signals.

4. The process according to claim 3, wherein said threshold pattern is different for respective color component signals.

5. A halftone image recording apparatus comprising:
   means for recording an image on a recording medium;
   means for inputting an image signal representative of an image which includes a plurality of density levels;
   periodic signal generating means for generating a plurality of types of periodic signals whose widths are different;
   means for combining at least one periodic signal generated by said generating means with said image signal to form a combined signal; and
   means for applying said combined signal to said recording means.

6. Apparatus according to claim 5, wherein said recording means performs a recording by the use of a light beam and the light beam is modulated by said combined signal.

7. Apparatus according to claim 5, wherein said means for combining includes means for processing the image signal in accordance with a threshold pattern to produce a binary signal, the threshold pattern being varied.

8. Apparatus according to claim 5, wherein said image signal is a color image signal including a plurality of color component signals.

9. A halftone image recording apparatus comprising:
means for recording an image on a recording medium;
means for inputting an image signal representative of an image which includes a plurality of density levels;
means for generating a periodical signal, said generating means being able to generate a plurality of types of periodical signals whose periods are different from each other;
means for forming a recording signal based on said periodical signal generated by said generating means and said image signal; and
means for applying said recording signal to said recording means.

10. Apparatus according to claim 9, wherein said periodical signal is a periodical pulse signal.

11. Apparatus according to claim 9, wherein said recording means performs a recording by use of a light beam and the light beam is modulated by said recording signal.

12. Apparatus according to claim 9, wherein said forming means includes means for processing said image signal in accordance with a threshold pattern signal to produce a binary signal, said pattern signal being varied by said generating means.

13. Apparatus according to claim 9, wherein said inputting means includes a reader for converting an image of an object into an image signal which includes a plurality of density levels.

14. Apparatus according to claim 9, wherein said image signal is a color image signal having a plurality of color components and said generating means and said applying means execute the generating and applying operations for every color component of said color image signal.

15. Apparatus according to claim 9, further comprising means for manually selecting the type of the periodical signal generated by said generating means.

16. Apparatus according to claim 15, wherein said periodical signal is a periodical pulse signal.

17. Apparatus according to claim 15, wherein said recording means performs recording by use of a light beam and the light beam is modulated by said recording signal.

18. A half-tone image recording apparatus, comprising:
image signal generation means for generating an image signal which represents an image including a half-tone image;
combined signal formation means for forming a combined signal by combining the image signal generated by said image signal generation means with a periodic signal selected from plural periodic signals, the plural periodic signals respectively having different periods;
supply means for supplying the combined signal into a recording device; and
changeover means for changing between forming a combined signal corresponding to a first periodic signal and forming a combined signal corresponding to a second periodic signal, said changeover means effecting the change by selecting a different periodic signal from the plural periodic signals, the period of the first periodic signal being different from that of the second periodic signal.

19. An apparatus according to claim 18, wherein said image signal generating means generates the image signal by reading an objective image.

20. An apparatus according to claim 18, wherein said recording device comprises:
a light generation device which is driven in response to the combined signal; and
a light sensitive body for receiving a light generated by said light generation device.

21. An apparatus according to claim 18, wherein the periods of the first and second periodic signals can be expressed substantially by an integer ratio.

22. An apparatus according to claim 18, further comprising:
set means for indicating a changeover state of said changeover means.

23. An apparatus according to claim 18, wherein said combined signal formation means further comprises a table to which the image signal is input as an address and which stores therein the combined signal.

24. An apparatus according to claim 20, further comprising:
means for detecting the light from said light generation device to generate a beam detector signal; and
control means for controlling a recording timing of said recording device in accordance with the beam detector signal.

25. Apparatus according to claim 5, wherein said combining means includes selection means for selecting at least one periodic signal with a selected width from among said plurality of periodic signals.

* * * * *

UNITED STATES PATENT AND TRADEMARK OFFICE
CERTIFICATE OF CORRECTION

PATENT NO. : 4,987,484
DATED : January 22, 1991
INVENTOR(S) : YOSHINORI IKEDA ET AL.

It is certified that error appears in the above-identified patent and that said Letters Patent is hereby corrected as shown below:

On the title page:

AT [63]

Related U.S. Application Data, "continuation-in-part" should read --continuation--.

SHEET 20 OF 21

FIG. 12-2, "RIGHT ADDRESS COUNTER" should read --WRITE ADDRESS COUNTER--.

COLUMN 6

Line 23, "numeral 72 23" should read --numeral 72-23--.

COLUMN 7

Line 22, "numeral 421 24" shoul dread --numeral 421-24--.
    Line 61, "clock board 24 7" should read --clock board 24-7--.
    Line 62, "driving shaft 24 10" should read --driving shaft 24-10--.

COLUMN 11

Line 22, "clock CLK 190 4," should read --clock CLK 190-4,--.

UNITED STATES PATENT AND TRADEMARK OFFICE
CERTIFICATE OF CORRECTION

PATENT NO. : 4,987,484

DATED : January 22, 1991

INVENTOR(S) : YOSHINORI IKEDA ET AL.

It is certified that error appears in the above-identified patent and that said Letters Patent is hereby corrected as shown below:

COLUMN 12

Line 37, "valves" should read --values--.
    line 39, "guantity" should read --quantity--.

COLUMN 13

Line 43, "V AMP" should read --V-AMP--.

COLUMN 14

Line 42, "numerals 130 2," should read --numerals 130-2--.
    Line 60, "NAND gate 130 20" should read --NAND gate 130-20--.
    Line 62, "RAMs 130 2," should read --RAMs 130-2,--.
    Line 65, "practiced in" should read --practiced. In--.

COLUMN 15

Line 23, "RAMs 130 2, 130 4, and 130 6" should read --RAMs 130-2, 130-4, and 130-6--.

COLUMN 16

Line 34, "advisable es-" should read --advisable to es---.

UNITED STATES PATENT AND TRADEMARK OFFICE
CERTIFICATE OF CORRECTION

PATENT NO. : 4,987,484

DATED : January 22, 1991

INVENTOR(S) : YOSHINORI IKEDA ET AL.

It is certified that error appears in the above-identified patent and that said Letters Patent is hereby corrected as shown below:

COLUMN 18

Line 20, "FIGS. 2-4." should read --FIG. 2-4.--.

Line 54, "$Yo=a_1a_1Yi-b_1Mi-c_1Ci$ (3)" should read --$Yo=a_1Yi-b_1Mi-c_1Ci$ (3)--.

Line 56, "$Mo=-1_2Yi+b_2Mi-c_2Ci$ (4)" should read --$Mo=-a_2Yi+b_2Mi-c_2Ci$ (4)--.

COLUMN 19

Line 24, "signal line 150 12;" should read --signal line 150-12;--.

Line 25, "signal line 150 14;" should read --signal line 150-14;--.

Line 33, "numbers 150 1," should read --numbers 150-1,--.

COLUMN 20

Line 22, "correspondinq" should read --corresponding--.

Line 34, "circuits 160 13, 160 14 and 160 15." should read --circuits 160-13, 160-14 and 160-15.--.

COLUMN 21

Line 23, "signal lines 405 1, 405 2," should read --signal lines 405-1, 405-2,--.

COLUMN 23

Line 49, "lead address counter 180-5" should read --read address counter 180-5--.

UNITED STATES PATENT AND TRADEMARK OFFICE
CERTIFICATE OF CORRECTION

PATENT NO. : 4,987,484
DATED : January 22, 1991
INVENTOR(S) : YOSHINORI IKEDA ET AL.

It is certified that error appears in the above-identified patent and that said Letters Patent is hereby corrected as shown below:

COLUMN 24

Line 51, "100 C." should read --$\phi$C.--.
Line 60, "right address counter 180-1" should read --write address counter 180-1--.

COLUMN 25

Line 7, "signals 100A and 100B" should read --signals $\phi$A and $\phi$B--.
Line 9, "100 C" should read --$\phi$C--.
Line 30, "right address counter 180-1" should read --write address counter 180-1--.
Line 40, "100 A" should read --$\phi$A--.

COLUMN 28

Line 21, "image signal generating means" should read --image signal generation means--.

Signed and Sealed this

Third Day of November, 1992

Attest:

DOUGLAS B. COMER

Attesting Officer    Acting Commissioner of Patents and Trademarks